(12) United States Patent
Miyake

(10) Patent No.: US 7,907,583 B2
(45) Date of Patent: *Mar. 15, 2011

(54) COMMUNICATION TERMINAL APPARATUS, COMMUNICATION METHOD THEREOF, AND CONNECTED DESTINATION SELECTION METHOD IN WIRELESS LAN

(75) Inventor: Izumi Miyake, Asaka (JP)

(73) Assignee: Fujifilm Corporation, Tokyo (JP)

( * ) Notice: Subject to any disclaimer, the term of this patent is extended or adjusted under 35 U.S.C. 154(b) by 753 days.

This patent is subject to a terminal disclaimer.

(21) Appl. No.: 11/882,715

(22) Filed: Aug. 3, 2007

(65) Prior Publication Data

US 2007/0286144 A1 Dec. 13, 2007

Related U.S. Application Data

(63) Continuation of application No. 09/708,630, filed on Nov. 9, 2000, now Pat. No. 7,403,510.

(30) Foreign Application Priority Data

Nov. 10, 1999 (JP) ..................................... 11-319814
Nov. 10, 1999 (JP) ..................................... 11-319815

(51) Int. Cl.
*H04W 4/00* (2009.01)
(52) U.S. Cl. ....................... 370/338; 455/414.1; 455/418
(58) Field of Classification Search ................ 455/414.1, 455/418
See application file for complete search history.

(56) References Cited

U.S. PATENT DOCUMENTS

| | | | |
|---|---|---|---|
| 5,315,639 A | 5/1994 | Lassers | |
| 5,428,388 A | 6/1995 | von Bauer et al. | |
| 5,771,352 A | 6/1998 | Nakamura et al. | |
| 5,819,175 A | 10/1998 | Niemi | |
| 5,826,193 A | 10/1998 | Ghisler et al. | |
| 5,844,893 A | 12/1998 | Gollnick et al. | |
| 5,923,757 A | 7/1999 | Hocker et al. | |
| 5,930,368 A | 7/1999 | Hocker et al. | |
| 6,067,076 A | 5/2000 | Hocker et al. | |
| 6,072,468 A | 6/2000 | Hocker et al. | |
| 6,246,320 B1 | 6/2001 | Monroe | |

(Continued)

FOREIGN PATENT DOCUMENTS

EP 0939531 A2 9/1999

(Continued)

*Primary Examiner* — Min Jung
(74) *Attorney, Agent, or Firm* — Birch, Stewart, Kolasch & Birch, LLP

(57) ABSTRACT

To provide a communication terminal apparatus including a first wireless communication unit that can connect with a host computer, a second wireless communication unit that can connect with connecting equipment by wireless, an equipment information storage unit for storing image information showing an appearance of the above-described connecting equipment, a display unit for displaying the appearance of the connecting equipment, and a designating unit for establishing communication with the connecting equipment thereafter, which is designated, when the appearance of the desired connecting equipment that is displayed in the above-described display unit is designated, in which, since the above-described wireless communication unit receives and displays image information showing the appearance of the above-described connecting equipment from the host computer if the image information showing the appearance of the above-described connecting equipment is not stored in the equipment information storage unit. Hence it becomes possible for the communication terminal apparatus to receive the appearance and product names of all the connecting equipment that are connected to the communication terminal apparatus, to display them in the display unit, and to establish communication.

4 Claims, 22 Drawing Sheets

U.S. PATENT DOCUMENTS

| | | |
|---|---|---|
| 6,529,119 B1 | 3/2003 | Kumar et al. |
| 6,573,927 B2 | 6/2003 | Parulski et al. |
| 6,577,859 B1 | 6/2003 | Zahavi et al. |
| 6,584,306 B2 | 6/2003 | Mirabelli |
| 6,601,102 B2 | 7/2003 | Eldridge et al. |
| 6,628,326 B1 | 9/2003 | Manico et al. |
| 6,681,120 B1 | 1/2004 | Kim |
| 6,751,455 B1 | 6/2004 | Acampora |
| 6,757,531 B1 | 6/2004 | Haaramo et al. |
| 6,784,924 B2 | 8/2004 | Ward et al. |
| 6,788,332 B1 | 9/2004 | Cook |
| 6,850,510 B2 | 2/2005 | Kubler et al. |
| 6,871,063 B1 * | 3/2005 | Schiffer ................. 455/410 |
| 7,403,510 B1 * | 7/2008 | Miyake ................. 370/338 |
| 2003/0025808 A1 | 2/2003 | Parulski et al. |
| 2005/0179942 A1 * | 8/2005 | Stavely et al. ............ 358/1.15 |

FOREIGN PATENT DOCUMENTS

| | | |
|---|---|---|
| JP | 64-16133 | 1/1989 |
| JP | 5-167669 A | 7/1993 |
| JP | 7-336370 A | 12/1995 |
| JP | 08-018813 A | 1/1996 |
| JP | 9-130426 | 5/1997 |
| JP | 9-182156 A | 7/1997 |
| JP | 10-341303 A | 12/1998 |
| JP | 11-83976 A | 3/1999 |
| JP | 11-85858 A | 3/1999 |
| JP | 11-150547 | 6/1999 |
| JP | 11-259247 | 9/1999 |
| JP | 11-259393 A | 9/1999 |
| JP | 11-261875 A | 9/1999 |

* cited by examiner

F I G. 1
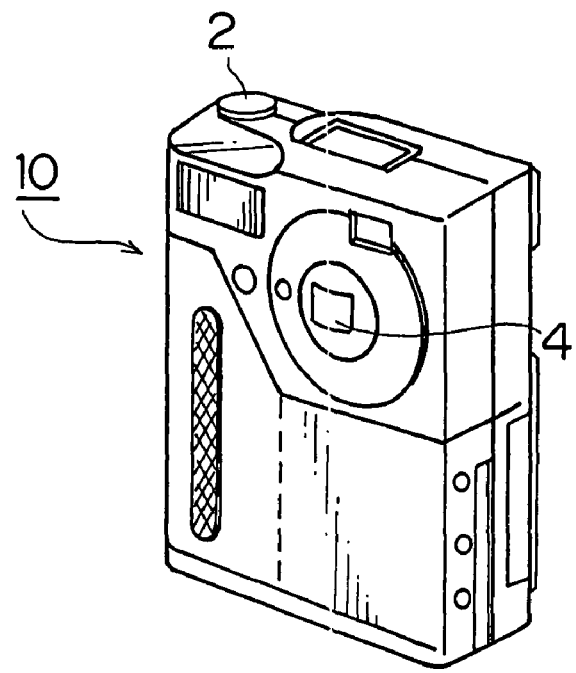
F I G. 2
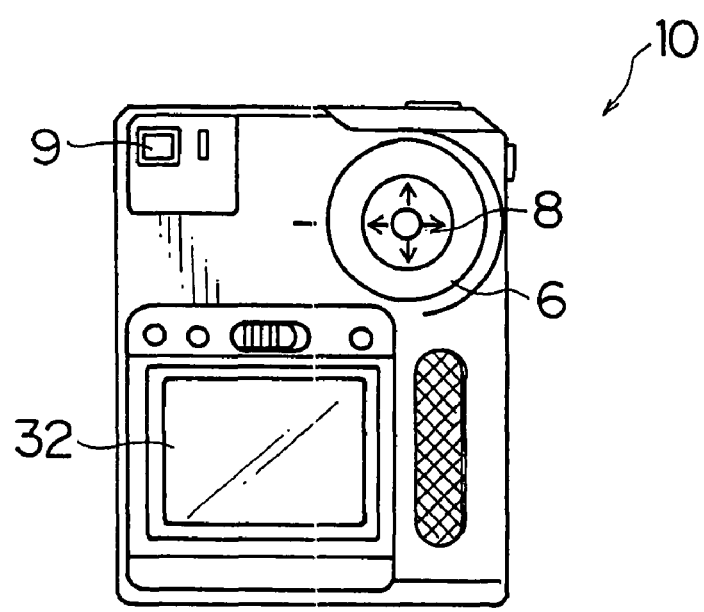

US 7,907,583 B2

COMMUNICATION TERMINAL APPARATUS, COMMUNICATION METHOD THEREOF, AND CONNECTED DESTINATION SELECTION METHOD IN WIRELESS LAN

This application is a Continuation of application Ser. No. 09/708,630, filed on Nov. 9, 2000 now U.S. Pat. No. 7,403,510, the entire contents of the above-identified application is hereby incorporated by reference.

BACKGROUND OF THE INVENTION

1. Field of the Invention

The present invention relates to a communication terminal apparatus, a communication method thereof, and at connected destination selection method in wireless LAN, and in particular, to a communication terminal apparatus, which can transmit information with a plurality of connecting equipment by wireless, a communication method thereof, and Et connected destination selection method in a wireless LAN.

2. Description of Related Art

An information service system, which controls not to communicate if the information that should be downloaded does not exist when information is downloaded from a server by using a small communication terminal, is disclosed in Japanese Patent Laid-Open No. 9-130426.

In addition, an information service system that recognizes positional information of a communication terminal apparatus connected and transmits the positional information to the communication terminal apparatus is disclosed in Japanese Patent Laid-Open No. 11-83976.

A mutual registration method of information, by which information necessary at the time when wireless communication between PHS extensions is performed without a main phone can be registered between two PHS extensions, is disclosed in Japanese Patent Laid-Open No. 9-182156.

In addition, a telephone apparatus that can easily identify a name of a caller who gets on the phone is disclosed in Japanese Patent Laid-Open No. 5-167669.

However, in a communication terminal disclosed in the Japanese Patent Laid-Open No. 9-130426 and the Japanese Patent Laid-Open No. 11-83976, a method for acquiring information of connecting equipment which is further connected to a communications terminal and can perform wireless communication is not disclosed.

In the case of a system including connecting equipment that can perform wireless communication and is connected to a communication terminal, it is conceivable to instruct a user to select desired connecting equipment from among listed equipment by displaying a list of the equipment, which can connect to the communication terminal, in a display device of the communications terminal in such an aspect of outside views of the connecting equipment when the user is going to select connecting equipment to which the user desires to perform communication connection. Although it is convenient that the connecting equipment information displayed is stored in the connecting equipment, it is diseconomy that information having big file size like an appearance image of connecting equipment is stored in the connecting equipment. In addition, although it is conceivable that a communication terminal stores appearance image information of all the connecting equipment that can be connected to the communication terminal, it is difficult to always have appearance information about new models of the connecting equipment.

In the registration method of information disclosed in the Japanese Patent Laid-Open No. 9-182156, only the registration of one-to-one communication can be performed, and it is necessary to provide an infrared communication port.

Furthermore, a telephone apparatus disclosed in the Japanese Patent Laid-Open No. 5-167669 just searches and displays a caller's name corresponding to a telephone number received, mutual authentication of telephones is impossible, and further the telephone apparatus corresponds only to one-to-one communication.

SUMMARY OF THE INVENTION

The present invention has been made in consideration of such circumstances, and its object is to provide a communication terminal apparatus and a communication method that can receive and display the information of appearance and product names of all the connected equipment, which are communicatively connected to the communication terminal, by a communication terminal, and establish communication.

The present invention has been achieved in consideration of such circumstances, and its another object is to provide a connected destination selection method in a wireless LAN for selecting desired connecting equipment from among a plurality of connecting equipment existing within a communication range of connected equipment, and communicating with the desired connecting equipment.

In order to attain above-described objects, the present invention is directed to a communication terminal apparatus, comprising: a communication device which is connectable with a host computer; a wireless communication device which is connectable with connecting equipment by wireless communication; a storage device which stores image information showing appearance of the connecting equipment; a display device which displays appearance of connecting equipment on the basis of image information showing the appearance of the connecting equipment that is stored in the storage device when wireless communication with the connecting equipment is started; and a designating device which establishes communication with connecting equipment thereafter which is designated, when appearance of the desired connecting equipment that is displayed in the display device is designated, wherein the communication device receives and stores image information showing the appearance of the connecting equipment from the host computer if the image information showing the appearance of the connecting equipment is not stored in the storage device.

According to the present invention, it becomes possible for the communication terminal to receive the appearance and product names of all the connecting equipment which are connected to the communication terminal, to display them in the display device, and to establish communication with designating desired connecting equipment.

In order to attain above-described objects, the present invention is directed to a communication method of the above-described communication terminal apparatus, the communication terminal apparatus performing transmission and reception of data with a host computer and connecting equipment through the communication terminal apparatus after communication is established between the communication terminal apparatus; and the connection equipment, wherein, when the communication terminal apparatus establishes communication with desired connecting equipment, the communication terminal apparatus performs the method comprising the steps of (a) receiving equipment information, showing the connecting equipment, from connecting equipment; (b) connecting to the host computer on the basis of the equipment information, and receiving image information, showing appearance of the connecting equipment, from the host computer; (c) displaying appearance of the connecting equipment in the display device of the communication terminal apparatus on the basis of the image information which is received or was received and stored beforehand; and (d) establishing communication with the connecting equipment that is designated, when appearance of the desired connecting equipment that is displayed in the display device is designated.

According to the present invention, when a communication terminal apparatus establishes communication with desired connecting equipment, the communication terminal apparatus executes the steps of: (a) receiving equipment information, showing the connecting equipment, from the connecting equipment; (b) connecting to the host computer on the basis of the equipment information, and receiving image information, showing the appearance of the connecting equipment, from the host computer; (c) displaying the appearance of the connecting equipment in a display device of the communication terminal apparatus on the basis of the image information which is received or was received and stored beforehand; and (d) establishing communication with connecting equipment, which is designated, when the appearance of the desired connecting equipment that is displayed in the display device is designated, and hence it becomes possible for the communication terminal to receive the appearance and product names of all the connecting equipment which are connected to the communication terminal, to display them in the display device, and to establish communication with designating the desired connecting equipment.

In order to attain above-described objects, the present invention is directed to a connected destination selection method in a wireless LAN, the wireless LAN comprising: connecting equipment which can perform wireless communication; and connected equipment which can perform wireless communication with the connecting equipment and includes a display device and a designating device, wherein: the wireless LAN automatically starts communication when the connected equipment and the connecting equipment come within a wireless communication range; the connected equipment receives identification information that can specify the connecting equipment from among the connecting equipment; the display device of the connected equipment displays identification information for identifying connecting equipment; and the wireless LAN establishes wireless connection between the connecting equipment and the connected equipment when desired (connecting equipment is designated from among the displayed connecting equipment.

According to the present invention, the connected equipment and the connecting equipment automatically start communication when coming within a wireless communication range; the connected equipment receives identification information that can specify the connecting equipment from among the connecting equipment; a display device of the connected equipment displays the identification information for identifying connecting equipment; the wireless LAN establishes wireless communication between the connecting equipment and the connected equipment when desired connecting equipment is designated from among the displayed connecting equipment, and hence it becomes possible to select desired connecting equipment from among a plurality of connecting equipment existing in a communication range of the connected equipment, and to communicate with the desired connecting equipment.

In order to attain above-described objects, the present invention is directed to a connected destination selection method in a wireless LAN, the wireless LAN comprising: connecting equipment which can perform wireless communication; and connected equipment which can perform wireless communication with the connecting equipment, wherein: according to pressing of a key, provided in the connecting equipment, and a key, provided in the connected equipment, wireless connection between the connected equipment and the connecting equipment is established.

According to the present invention, depending on pressing of a key provided in the connecting equipment, and a key provided in the connected equipment, wireless communication between the connected equipment and the connecting equipment is established, and hence it becomes possible to select desired connecting equipment from among a plurality of connecting equipment existing in a communication range of the connected equipment, and to communicate with the desired connecting equipment.

In order to attain above-described objects, the present invention is directed to a connected destination selection method in a wireless LAN, the wireless LAN comprising: connecting equipment which can perform wireless communication; and connected equipment which can perform wireless communication with the connecting equipment, wherein: if a predetermined key, provided in the connecting equipment, and a predetermined key, provided in the connected equipment, are pressed nearly at the same time, wireless connection between the connected equipment and the connecting equipment is established.

According to the present invention, if a predetermined key provided in the connecting equipment, and a predetermined key provided in the connected equipment are pressed nearly at the same time, wireless communication between the connected equipment and the connecting equipment is established, and hence it becomes possible to select desired connecting equipment from among a plurality of connecting equipment existing in a communication range of the connected equipment, and to communicate with the desired connecting equipment.

In order to attain above-described objects, the present invention is directed to a connected destination selection method in a wireless LAN, the wireless LAN comprising: connecting equipment which can perform wireless communication; and connected equipment which can perform wireless communication with the connecting equipment, wherein: if a predetermined key, provided in the connecting equipment, and a predetermined key, provided in the connected equipment, are pressed in predetermined sequence, wireless connection between the connected equipment and the connecting equipment is established.

According to the present invention, wireless communication between the connected equipment and the connecting equipment is established if a predetermined key provided in the connecting equipment, and a predetermined key provided in the connected equipment are pressed in predetermined order, and hence it becomes possible to select desired connecting equipment from among a plurality of connecting equipment existing in a communication range of the connected equipment, and to communicate with the desired connecting equipment.

In order to attain above-described objects, the present invention is directed to a connected destination selection method in a wireless LAN, the wireless LAN comprising: connecting equipment which can perform wireless communication; and connected equipment which can perform wireless communication with the connecting equipment, wherein: when the connected equipment receives sound that is unique to the connecting equipment and is given from the connecting equipment, wireless connection between the connected equipment and the connecting equipment is established.

According to the present invention, when the connected equipment receives the sound that is unique to and is given from the connecting equipment, wireless communication between the connected equipment and the connecting equipment is established, and hence it becomes possible to select desired connecting equipment from among a plurality of connecting equipment existing in a communication range of the connected equipment, and to communicate with the desired connecting equipment.

In order to attain above-described objects, the present invention is directed to a connected destination selection method in a wireless LAN, the wireless LAN comprising: connecting equipment which can perform wireless communication and take a photograph; and connected equipment which can perform wireless communication with the connecting equipment and includes a display device, wherein: the connecting equipment takes a photograph of expression in the display device of the connected equipment so as to detect displayed contents of the connected equipment; and the connecting equipment establishes wireless connection with the connected equipment if the displayed contents of the connected equipment are contents predetermined.

According to the present invention, the connecting equipment photographs expression in a display device of the connected equipment; displayed contents of the connected equipment are detected; and wireless communication with the connected equipment is established if these displayed contents are equal to predetermined displayed contents, and hence it becomes possible to select desired connecting equipment from among a plurality of connecting equipment existing in a communication range of the connected equipment, and to communicate with the desired connecting equipment.

In order to attain above-described objects, the present invention is directed to a connected destination selection method in a wireless LAN, the wireless LAN comprising: connecting equipment which can perform wireless communication and can detect vibration or impact sound; and connected equipment which can perform wireless communication with the connecting equipment and can detect at least one of vibration and impact sound, wherein: wireless connection is established by the connecting equipment and the connected equipment recognizing each other if the connecting equipment and the connected equipment are contacted.

According to the present invention, if the connecting equipment and the connected equipment are contacted, the connected equipment and the connecting equipment recognize each other and wireless communication between the connected equipment and the connecting equipment is established, and hence it becomes possible to select desired connecting equipment from among a plurality of connecting equipment existing in a communication range of the connected equipment, and to communicate with the desired connecting equipment.

In order to attain above-described objects, the present invention is directed to a connected destination selection method in a wireless LAN, the wireless LAN comprising: connecting equipment which can perform wireless communication; and connected equipment which can perform wireless communication with the connecting equipment and includes an information device giving at least one of sound, light, and vibration, the method comprising the steps of: automatically establishing wireless connection when the connected equipment and the connecting equipment come within a wireless communication range; and informing a user of establishment of the wireless connection by giving sound, light, or vibration from the information device provided in the connected equipment when the wireless connection is completely established.

According to the present invention, wireless connection is automatically established when the connected equipment and the connecting equipment come within a communicable range and a user is informed of the establishment of wireless connection by giving a sound, light, or vibration from the information device provided in the connected equipment when the wireless connection is established, and hence it becomes possible to easily know that desired connecting equipment is selected from among a plurality of connecting equipment existing in a communication range of the connected equipment.

In order to attain above-described objects, the present invention is directed to a connected destination selection method in a wireless LAN, the wireless LAN comprising: connecting equipment which can perform wireless communication; and connected equipment which can perform wireless communication with the connecting equipment, the method comprising the steps of: automatically starting communication when the connected equipment and the connecting equipment come within a communication range; sending common key information, used for authentication, to the connecting equipment and establishing wireless connection by detecting that a common key, provided in the connecting equipment, and a common key, provided in the connected equipment, are pressed, if it is the first time connection; sending predetermined key information, used for authentication, to the connecting equipment, and continuing communication as information for recognizing a user by detecting that a predetermined key, provided in the connecting equipment, and a predetermined key, provided in the connected equipment, are pressed, if it is the second time connection; and recognizing the user and continuing communication by detecting that a predetermined key, provided in the connecting equipment, and a predetermined key, provided in the connected equipment, are pressed, if it is the third time connection or after.

According to the present invention, communication is automatically started when the connected equipment and the connecting equipment come within a communicable range; common key information used for authentication is sent to the connecting equipment if it is the first time connection, and wireless connection is established by detecting that a common key provided in the connecting equipment, and a common key provided in the connected equipment are pressed; predetermined key information used for authentication is sent to the connecting equipment if it is the second time connection, and communication is continued as information for recognizing a user by detecting that a predetermined key provided in the connecting equipment, and a predetermined key provided in the connected equipment are pressed; the user is recognized and communication is continued by detecting that a predetermined key provided in the connecting equipment, and a predetermined key provided in the connected equipment are pressed, if it is after third time connection, and hence it becomes possible to easily select desired connecting equipment from among a plurality of connecting equipment existing in a communication range of connected equipment, and to communicate with the desired connecting equipment.

In order to attain above-described objects, the present invention is directed to a connected destination selection method in a wireless LAN, the wireless LAN comprising: connecting equipment which can perform wireless communication; and connected equipment which can perform wireless communication with the connecting equipment, wherein:

wireless connection is automatically authenticated each other and established when the connected equipment and the connecting equipment come within a communication range; and a user is able to designate a mode, in which mutual authentication is limited to the first time one, or another mode, in which mutual authentication is performed first two times and more, from a designating device provided in the connected equipment.

According to the present invention, both of connected equipment and connecting equipment automatically authenticate each other and wireless connection is established when coming within a communicable range; and a user can designate a mode, in which mutual authentication is limited to the first time authentication, or another mode, in which mutual authentication is performed first two times and more, from a designating device provided in the connected equipment, and hence it becomes possible to select desired connecting equipment from among a plurality of connecting equipment existing in a communication range of connected equipment, and to prevent unnecessary communication.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a perspective view of an electronic camera that can perform wireless connection with wireless communication terminal;

FIG. 2 is a rear view of the electronic camera;

DETAILED DESCRIPTION OF THE PREFERRED EMBODIMENT

Figure 3:
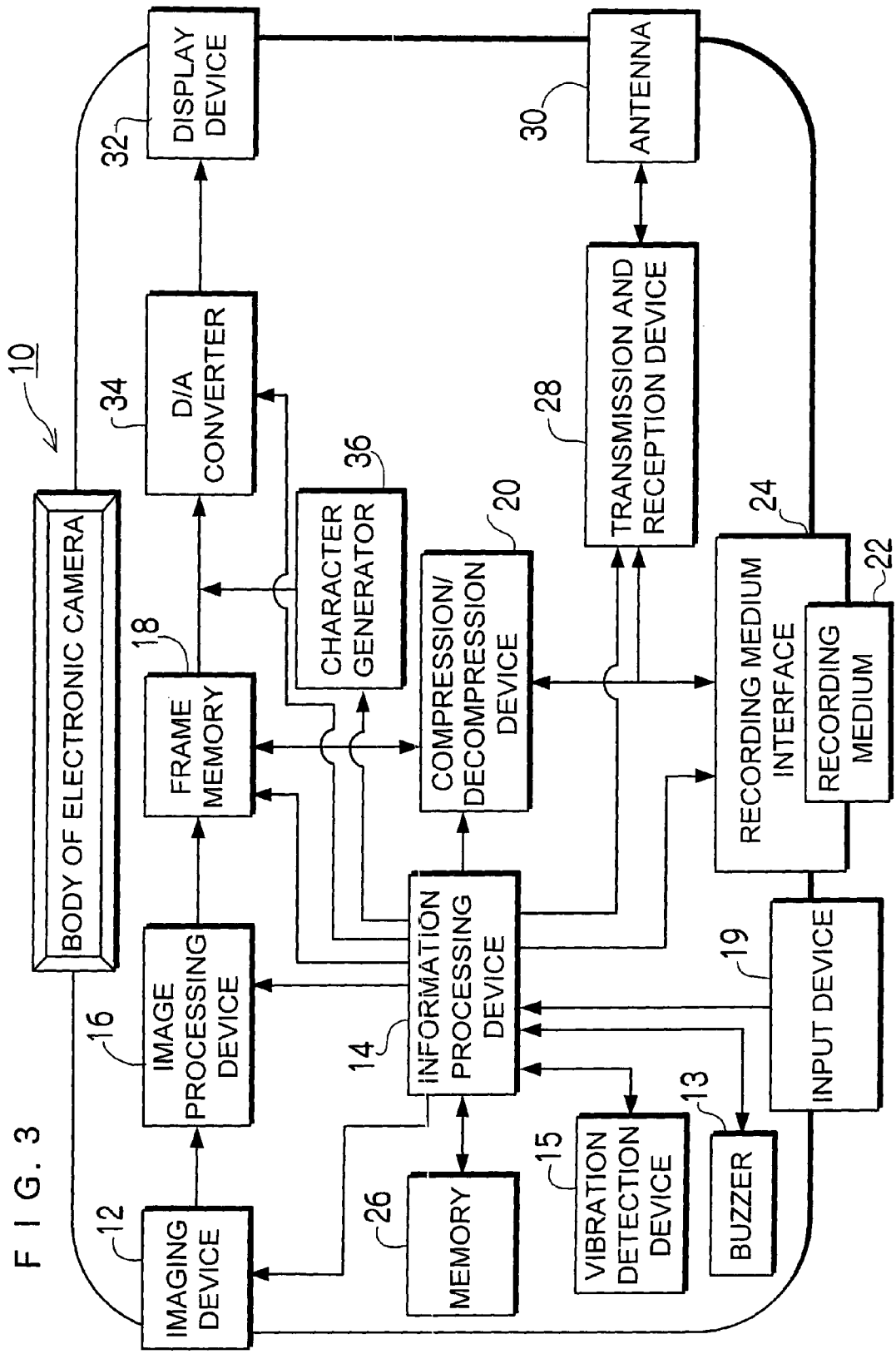
FIG. 3 is a block diagram of the electronic camera.

Hereinafter, preferred embodiments of a communication terminal apparatus and a communication method thereof according to the present invention will be described in detail with reference to accompanying drawings.

FIG. 1 is a perspective view of a wireless communication terminal, which is connected equipment, and an electronic camera that is connecting equipment that can be connected by wireless.

According to the drawing, in front of an electronic camera 10, a release button 2 and a taking lens 4 are provided.

FIG. 2 is a rear view of the electronic camera shown in FIG. 1.

According to the drawing, in a back face of the electronic camera 10: a mode switching dial 6 which switches among modes of photography, display, and communication of the electronic camera 10; a cross key 8 instructing movement of a cursor, displayed in a display device 32, and communication start; a finder 9; and the display device 32 are provided.

FIG. 3 is a block diagram of a communication terminal apparatus and an electronic camera that is connecting equipment that can be connected by wireless.

The electronic camera 10 comprises: an imaging device 12 that forms an image of a subject on an imaging plane, performs photoelectric conversion, and outputs the image as image data; a buzzer 13; a data processing device 14 that performs the control of the entire electronic camera 10, and control such as sampling timing control of image data, recording control of image data, image recognition of image data, flash recognition of image data, reading of model information of this electronic camera 10, communication control, and display control; a vibration detection device 15 that detects a change and acceleration of vibration applied to the electronic camera 10; an image processing device 16 that performs processing such as modification of image size, sharpness correction, gamma correction, contrast correction, and white balance correction; frame memory 18 that temporarily stores image data; an input device 19 that includes a release button 2, a communication button, a transmission button, function switches, a cross key 8, a confirmation switch, a mode changeover switch, or the like; a compression and depression device 20 that performs compression control of information of image data or the like with a method being represented by JPEG or motion JPEG, and the processing of decompression control of compressed data; and a recording medium interface 24 that converts data so as to record image data in and read image data from a recording medium 22 that is detachable. The recording medium 22 is a recording medium that is detachable and is represented by a semiconductor, a magnetic recording medium, and an optical recording medium such as a memory card and MO.

Memory 26 comprising ROM, storing operation programs and each constant, and RAM that becomes a work area in program execution is connected to the data processing device 14.

A wireless communication device of the electronic camera 10 that is used for transmitting and receiving image data or the like with external equipment by communication is composed of a transmission and reception device 28, which transmits or receives image data with superimposing the image data on a carrier wave by an instruction from the data processing device 14, and an antenna 30, which transmits and receives the carrier wave and image data.

In addition, the electronic camera 10 further comprises a D/A converter 34 for displaying image data in the display device 32, and a character generator 36 converting code information, instructed from the data processing device 14, into data of characters and messages to be displayed.

Photographic processing of the electronic camera 10 composed as described above will be described.

An image to be photographed is formed on an imaging plane of the imaging device 12, and a subject image formed is photoelectrically converted and is outputted to the image processing device 16. Regarding the image data obtained in this manner, in the image processing device 16, amplification and noise reduction processing are executed, and the image data is temporarily stored in the frame memory 18. The data processing device 14 sequentially transfers the image data, stored in the above-described frame memory 18, to the D/A converter 34, and makes the image data displayed in the display device 32.

When the release button 2 provided in the input device 19 is pressed, a mode is switched to a mode of photographing a subject. Then, the data processing device 14 outputs an instruction of transferring the image data, stored in the frame memory 18, to the compression device 20 and performing compression processing of the image data under predetermined conditions. In addition, the data processing device 14 performs processing of making the recording medium interface 24 records, the image data in the sequential recording medium 22. Furthermore, when communication with the communication terminal is established and the transmission button provided in the input device 19 is pressed, the data processing device 14 reads the image data, which is designated, from the sequential recording medium 22, converts the image data into a predetermined data format, and thereafter performs processing of transmitting the image data to an external communication terminal through the transmission and reception device 28 and antenna 30.

Figure 4:
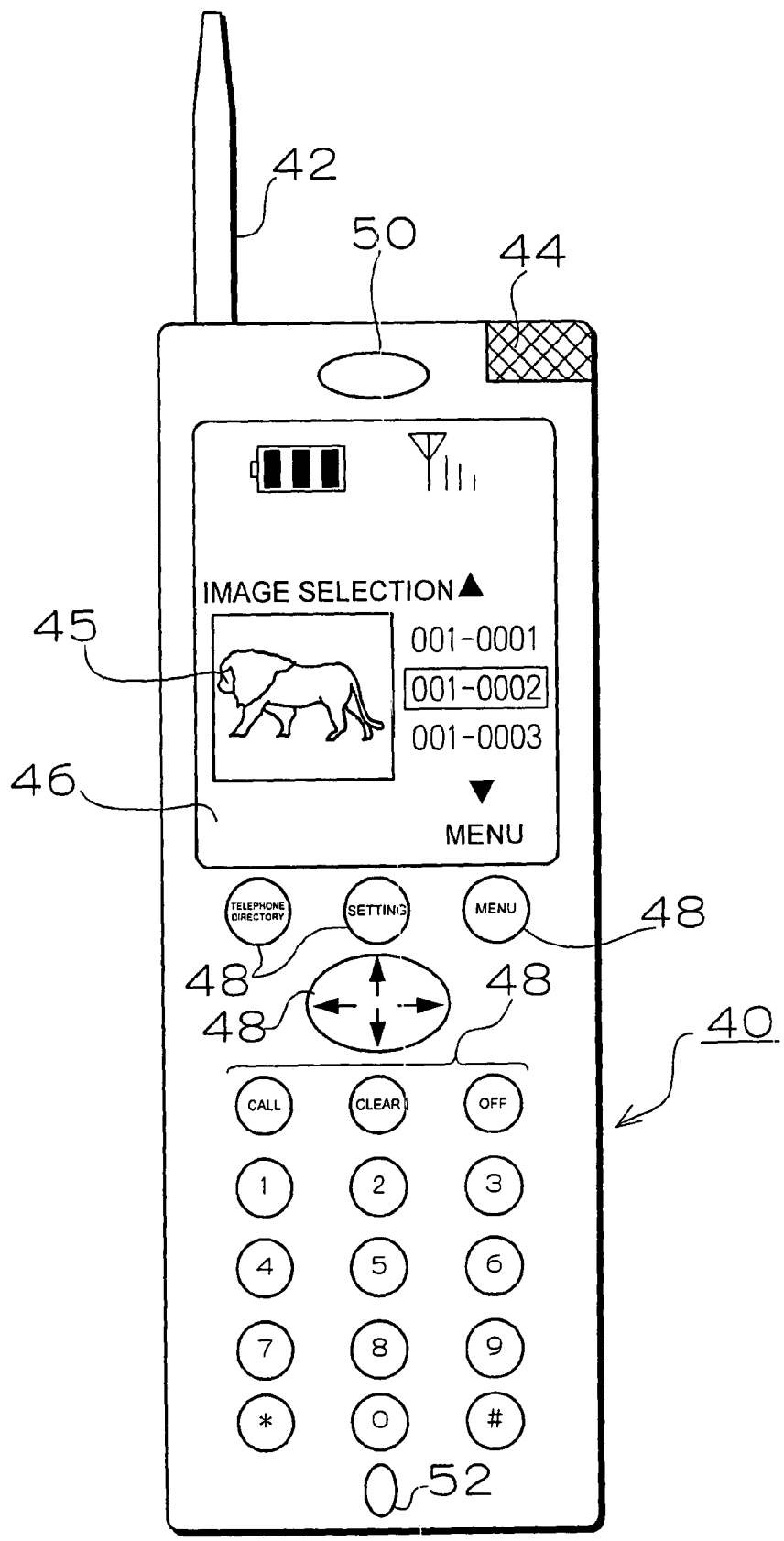
FIG. 4 is an appearance of a communication terminal.

FIG. 4 is an outside view of the communication terminal that is connected equipment.

As shown in FIG. 4, a communication terminal 40 comprises: an antenna 42 for performing wireless communication with a public line; a wireless communication device 44 that can connect with connecting equipment by wireless communication; a display device 46 displaying communication information and an image 45; designating devices 48, 48 . . . for designating and selecting data of telephone numbers, characters, images, and voice, and output equipment of the data, addresses thereof, or the like; a speaker 50 that becomes a telephone receiver and outputs voice; and a microphone 52 inputting voice and impact sound.

Figure 5:
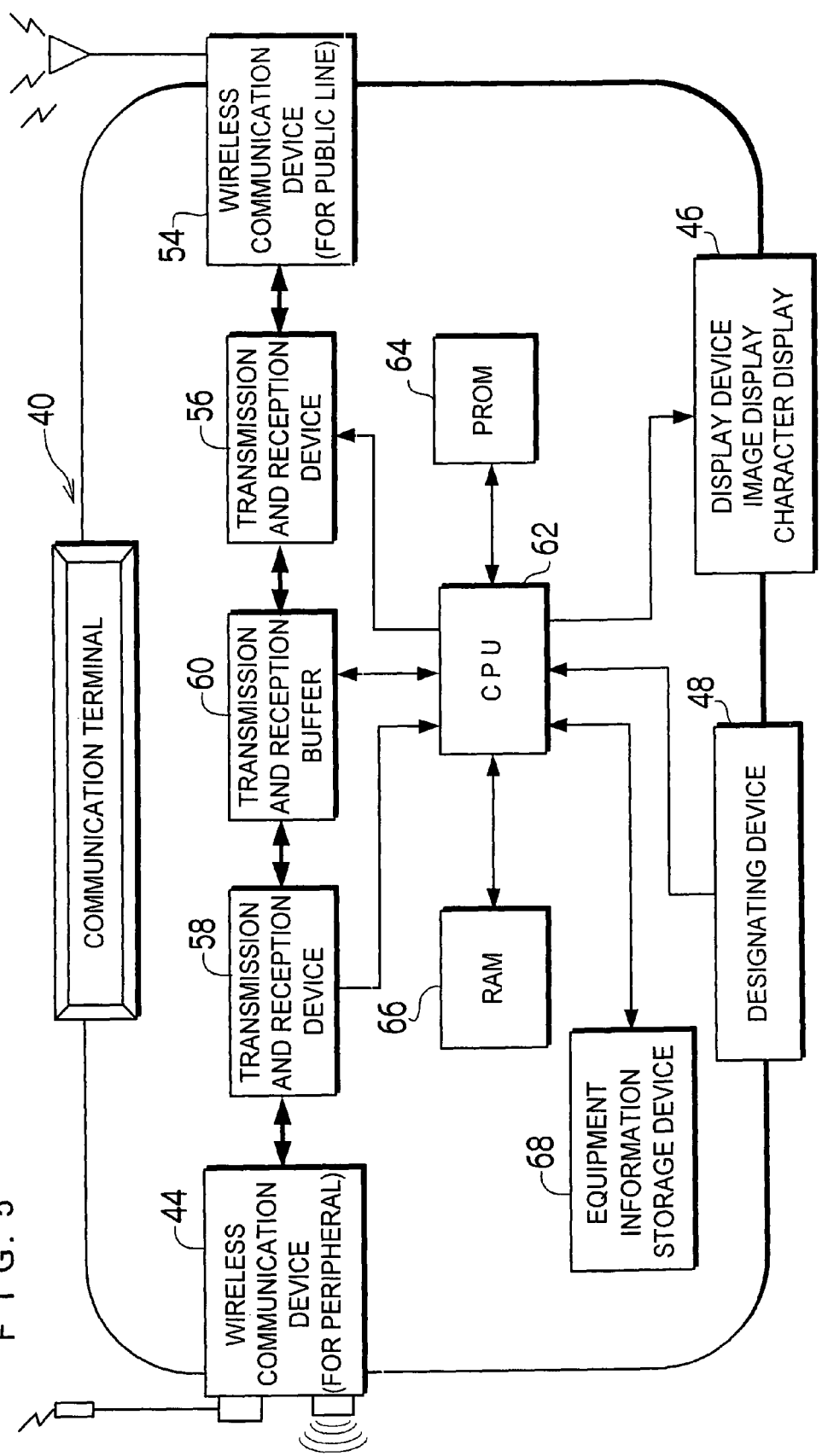
FIG. 5 is a block diagram of the communication terminal.

FIG. 5 is a block diagram of the communication terminal that is connected equipment.

According to the drawing, a transmission and reception section of the communication terminal 40 comprises: a public line wireless communication device 54 for performing wireless communication with a public line; a public line transmission and reception device 56; a wireless communication device 44 for performing wireless communication with connecting equipment; a transmission and reception device 58; and a transmission and reception buffer 60 temporarily storing data to be transmitted and received in real time.

In addition, the communication terminal 40 further comprises: a CPU 62 controlling the entire communication terminal 40; PROM 64 where programs operating the CPU 62, various constants, telephone numbers, destination addresses, information about appearance and product names of connecting equipment to be connected by wireless, or the like are written; RAM 66 that is a memory device that becomes a work area when the CPU 62 executes processing; and an equipment information storage device 68 for storing information relating to the appearance and product names of connecting equipment to be connected by wireless.

The CPU 62 in the communication terminal 40 and each peripheral circuit, including the display device 46, and a designating device 48, are connected with a communication device such as a bus line or I/O, and hence CPU 62 can control each peripheral circuit.

A communication device of the wireless communication device 44 is a communication device using an electric wave, an ultrasonic wave, or light like an infrared ray. It can be performed to be based on specifications of "Bluetooth" or a wireless LAN (Local Area Network), to which attention is paid, if the electric wave is used, and it can be done to be based on specifications of IrDA if the infrared ray is used.

In addition, although an example by using an electronic camera is described as connecting equipment in the above description, the connecting equipment can be a personal computer, a camera, a printer, or the like so long as the connecting equipment is the equipment including a display device, a memory device, and an output device. Furthermore, the communication terminal can be mobile communication terminal such as a cellular phone, or PHS which is generally used, or can be equipment such as an electronic camera or a printer.

Figure 6:
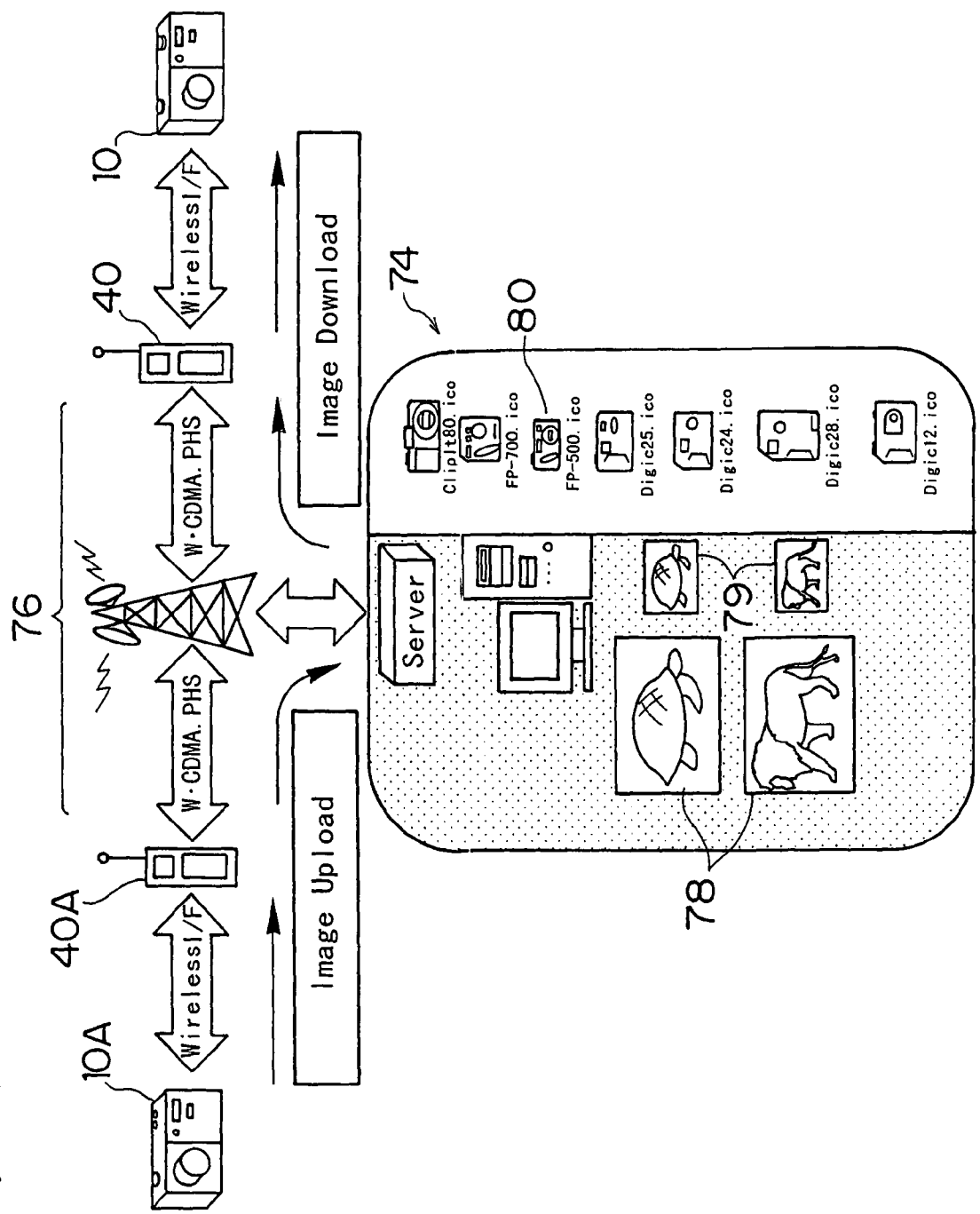
FIG. 6 is a drawing showing the configuration of peripheral equipment at the time of transmitting and receiving appearance and product names of connecting equipment by using a communication terminal apparatus and a communication method thereof.

FIG. 6 is a drawing showing the configuration of a peripheral unit when transmitting and receiving appearance and a unit name of connecting equipment using a communication terminal apparatus and a communication method thereof.

Images, which are photographed by the electronic cameras 10, 10A shown in the figure, images 78, 78, . . . , thumb nail images 79, 79, . . . , which are stored in a server 74, outside views 80 of the connecting equipment, and data and information about voice and characters are transmitted by wireless or wired communication to communication terminals 40, 40A. The communication terminal 40 and server 74 starts communication through a public line 76, and transmits images 78, 78, . . . , thumb nail images 79, 79, . . . , voice, characters, outside views 80 of the connecting equipment, and information about product names, which are prepared in the electronic camera 10A or server 74, to the communication terminal 40. The communication terminal 40 that receives images 78, 78, . . . , thumb nail images 79, 79, . . . , voice, characters, outside views 80 of the connecting equipment, and data about product names informs a user by displaying the contents, which are transmitted, in the display device 46. When the user selects and designates equipment to be connected by using the designating devices 48, 48, . . . , the communication terminal 40 hereafter establishes communication with designated connecting equipment.

In addition, the connecting equipment includes a display device, a store device, and an output device, and a personal computer, a camera, a printer corresponds to the connecting equipment.

Figure 7:
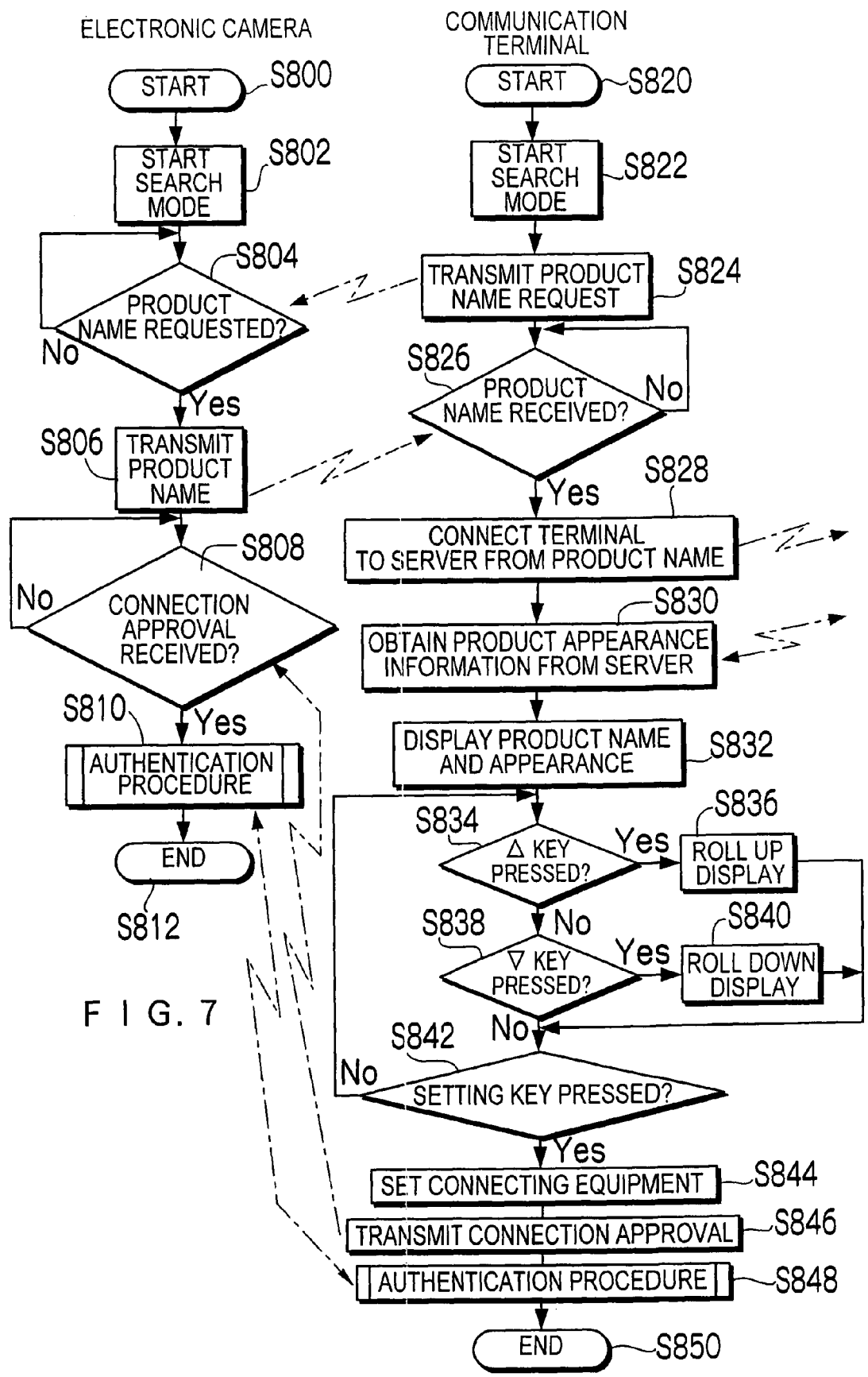
FIG. 7 is a flow chart when an electronic camera and a communication terminal establish communication.

FIG. 7 is a flow chart of a program when the electronic camera 10 and communication terminal 40 establish communication.

When a release button provided in the input device 19 of the electronic camera 10 is pressed, the program in the electronic camera 10 branches to step S800 "START" (hereinafter, this is expressed as S800 for short). In the next step S802 "Start search mode," the data processing device 14 activates the transmission and reception device 28, transmits a radio wave including a search signal from the antenna 30, and starts processing of searching for the communication terminal 40.

If the communication terminal 40 receives the search signal outputted from the electronic camera 10, the communication terminal 40 recognizes the electronic camera 10 that newly joins a communication network, assigns a unique address, and starts processing for performing a connection handshake.

In step S804 "Product name requested?", the electronic camera 10 performs processing of waiting for coming of a transmission request of attributes such as a product name of the electronic camera 10 by wireless communication transmission from the communication terminal 40. If "Product name request" does not come, the program loops step S804, and if "Product name request" comes, the program goes to the next step S806 "Transmit product name," and the electronic camera 10 transmits a product name of the electronic camera 10.

In the next step S808 "Connection approval received?", the electronic camera 10 performs processing of waiting for "Connection approval" with the electronic camera 10 that comes by wireless from the communication terminal 40. If "Connection approval" does not come, the program loops step S808, and if "Connection approval" comes, the program goes to the next step S810 "Authentication procedure" to perform communication relating to the authentication procedure. Further, in step S812 "END," the program completes connection processing with the communication terminal 40, and establish communication to return to an original program routine.

On the other hand, if a communicate mode is set by using the designating device 48 in a processing program of the communication terminal 40, the processing program of the communication terminal 40 branches step S820 "START." In the next step S822 "Start search mode," the CPU 62 activates the transmission and reception device 58 to transmit a radio wave from the wireless communication device 44, and start processing of searching connecting equipment.

In order to establish communication, the communication terminal 40 recognizes the electronic camera 10, which newly joins the wireless communication network, to assign a unique address, and starts processing of performing a connection handshake.

In step S824 "Transmit product name request," the communication terminal 40 requests the electronic camera 10 to transmit attributes such as a product name by wireless. Furthermore, in the next step S826 "Product name received?", the communication terminal 40 performs processing of waiting for the reception of information about the product name of the electronic camera 10 transmitted from the electronic camera 10. If "Product name reception" is not performed, the program loops step S824. Further, if "Product name reception" is performed, an outside drawing and a product name of the connecting equipment corresponding to the product name of the connecting equipment received are not stored in the equipment information storage device 68, and it is connecting equipment newly connected, the program goes to the next step S828 "Connect to server from product name," and the (communication terminal 40 transmits the product name of the electronic camera 10 to the server through a public line. In addition, if the product name received is already stored in the equipment information storage device 68, the program branches step S832 "Display product name and appearance."

In the next step S830 "Obtain product appearance information from server," the communication terminal 40 receives information about the image, showing appearance, and the name of the electronic camera 10 from server to perform processing of storing the information in the equipment information storage device 68. When the reception of the information is completed, the program goes to the next step S832 "Display product name and appearance" to display the connecting equipment information, stored in the equipment information storage device 68, in the display device 46.

Figure 8:
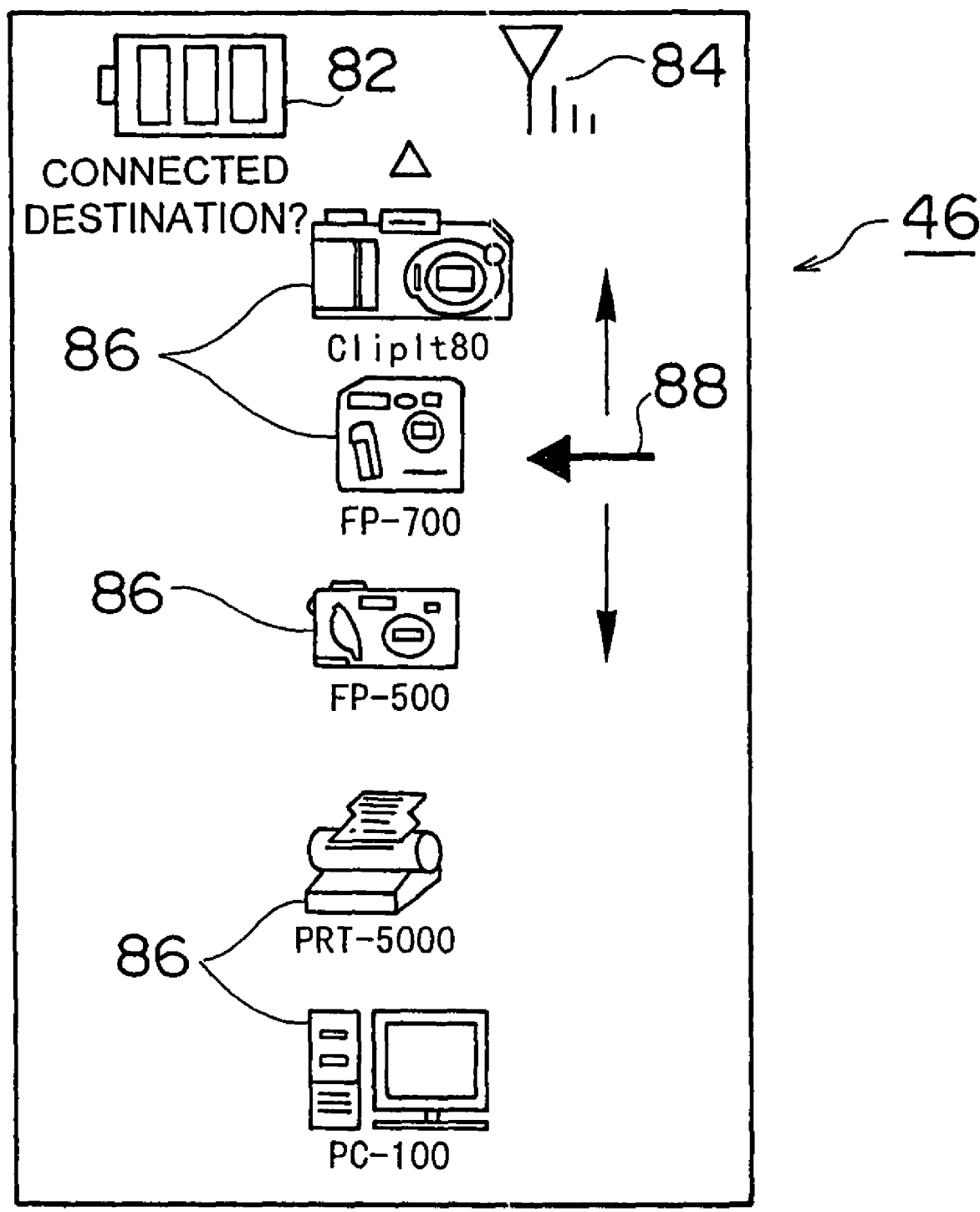
FIG. 8 is a drawing showing connecting equipment information displayed in a communication terminal.

FIG. 8 shows the connecting equipment information displayed in the display device 46 of the communication terminal 40.

According to the drawing, in the display device 46, battery available capacity display 82 showing the available capacity of the battery which is a power supply of the communication terminal 40, reception radio field intensity display 84 displaying reception radio field intensity of radio transmission, appearance display 86, 86, . . . , of the connecting equipment, and a pointer 88 at the time of selecting the connecting equipment are displayed.

In the next step S834 "<key pressed?", it is judged whether a "<key" provided in the designating device 48 is pressed. If the "<key" is pressed, the program goes to step S836 "Roll up display" to move a pointer 88, displayed in the display device 46, to the appearance display 86 of the connecting equipment that is upper in one line. Further, when the pointer 88 is completely moved, the program goes to step S842 "Setting key pressed?."

If it is judged that the "<key" is not pressed in step S834, the program goes to the next step S838 "=key pressed?", here, it is judged whether a "=key" provided in the designating device 48 is pressed. If the "=key" is pressed, the program goes to step S840 "Roll down display" to move a pointer 88, displayed in the display device 46, to the appearance display 86 of the connecting equipment that is lower in one line, and specifies the connecting equipment. Further, when the pointer 88 completely moves, the program goes to step S842 "Setting key pressed?".

In step S842, it is judged whether a "Setting key" provided in the designating device 48 is pressed. In step S842, if it is judged that the "Setting key" is not pressed, the program branches the former step S834 "<key presses?". If the "Setting key" is pressed, the program goes to step S844 "Set connecting equipment" to set constants, flags, and parameters relating to a model of connecting equipment.

In the next step S846 "Transmit connection approval," the communication terminal 40 transmits an enabling signal of communication connection to the electronic camera 10. After that, the electronic camera 10 and communication terminal 40 communicate with each other to establish a handshake in step S848 "Authentication procedure."

When the above-described authentication procedure is finished, the program completes connection processing with the electronic camera 10 in step S850 "END" to return to an original program routine.

Figure 9:
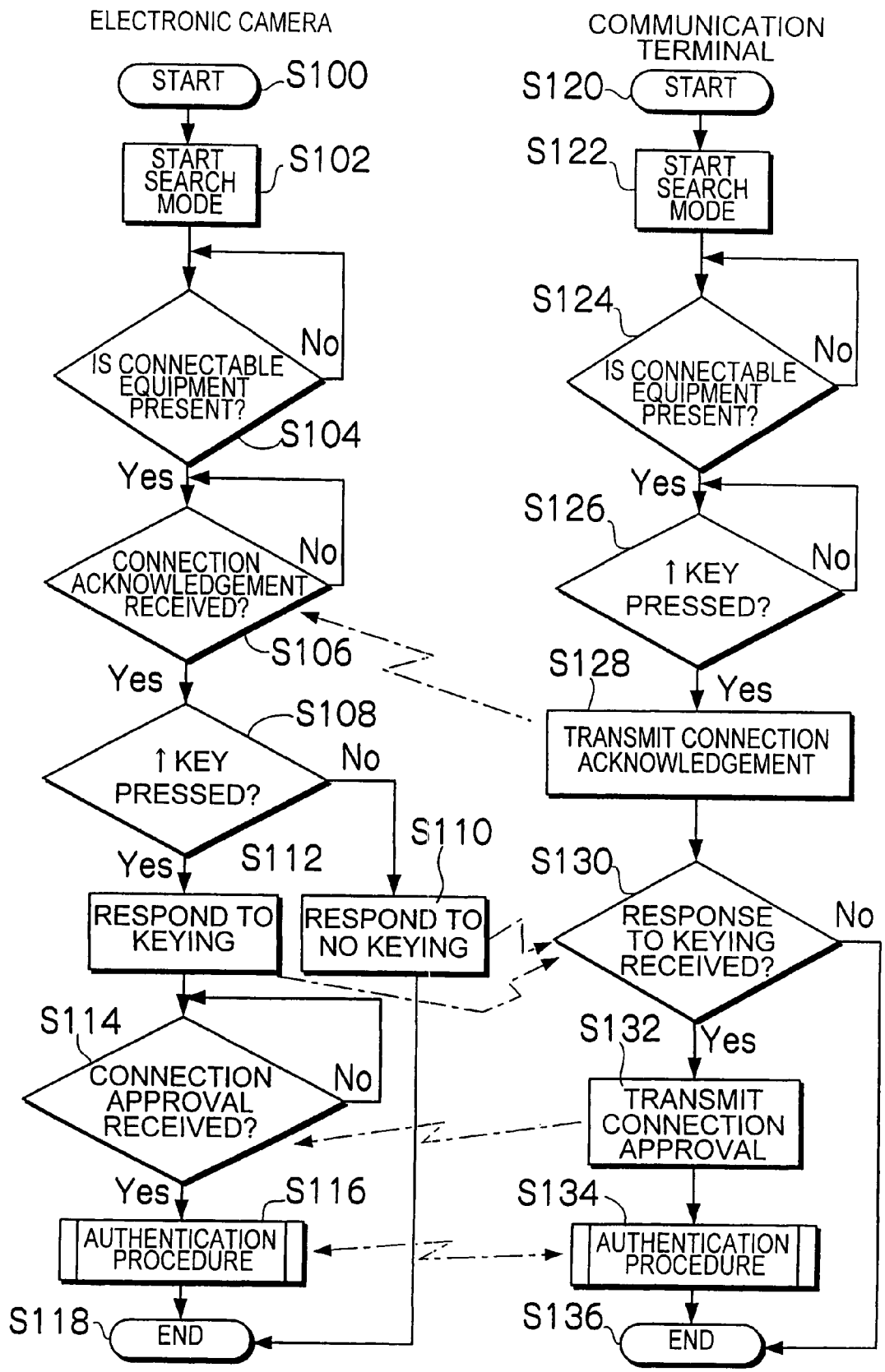
FIG. 9 is a flow chart when an electronic camera and a communication terminal establish communication.

FIG. 9 is a flow chart of a program when the electronic camera 10 and communication terminal 40 establish communication.

When the electronic camera 10 and communication terminal 40 come within a communication range mutually, each equipment recognizes this, and the program of the electronic camera 10 branches step S100 "START." In the next step S102 "Start search mode," the data processing device 14 transmits a radio wave including a search signal from the antenna 30 by a command, and starts processing of searching for the communication terminal 40.

If the electronic camera 10 receives the search signal outputted from the communication terminal 40 in step S104 "Is connectable equipment present?", so as to establish communication, the electronic camera 10 receives a unique address from the communication terminal 40, newly joins a communication network, and starts processing for performing a connection handshake. At this time, it can be also performed that a user selects and designates desired equipment from in this display by displaying a communicating state and information such as equipment names of partner's connecting equipment and communication terminal in the display device 32.

In the next step S106 "Connection acknowledgement received?", the electronic camera 10 performs processing of waiting for a "Connection acknowledgement" signal with the electronic camera 10 that comes by wireless from the communication terminal 40. If "Connection acknowledgement" is not transmitted, the program loops step S106, and if "Connection acknowledgement" is transmitted, the program goes to the next decision step S108 "↑ key pressed?".

In the next step S108 "↑ key pressed?", it is judged whether "↑ key" of a cross key 8 provided in the input device 19 of the electronic camera 10 is pressed. If it is judged that the "↑ key" is not pressed, the program goes to step S110 "Respond to no keying" to return a command, showing that the "↑ key" is not pressed, to the communication terminal 40. Then, the program goes to step S118 "END."

In addition, if it is judged in step S108 that the "↑ key" is pressed, the program goes to step S112 "Respond to keying" to return a command, showing that the "↑ key" is pressed, to the communication terminal 40. Further, in the next S114 "Connection approval received?", if the electronic camera 10 does not receive "Connection approval" from the communication terminal 40, the program performs loop processing of returning to step S114 again. Further, if the electronic camera 10 receives "Connection approval" from the communication terminal 40, the program goes to the next step S116 "Authentication procedure" to perform communication relating to authentication procedure. Furthermore, in step S118 "END," the program completes connection processing with the communication terminal 40, and returns to an original program routine.

On the other hand, in a processing program of the communication terminal 40, when the electronic camera 10 and communication terminal 40 come within a communication range mutually, each equipment recognizes this, and the program of the communication terminal 40 branches step S120 "START." In the next step S122 "Start search mode," the CPU 62 transmits a radio wave including a search signal from the wireless communication device 44, and starts processing of searching for connection terminal. At this time, it can be performed that a user selects and designates a desired communications partner from in this display by displaying information such as an equipment name of the electronic camera 10, which is communicating, and information such as names of other connecting equipment communicably existing within a communication range.

If the communication terminal 40 receives the search signal outputted from the electronic camera 10 in step S124 "Is connectable equipment present," so as to establish communication, the communication terminal 40 recognizes the communication terminal 40 that newly joins a communication network, assigns a unique address, and starts processing for performing a connection handshake.

In the next step S126 "↑ key pressed?", it is judged whether "↑ key" of a cross key 8 provided in the designating device 48 is pressed. If the "↑ key" is not pressed, the program loops step 5126, and if the "↑ key" is pressed, the program goes to the next step S128 "Transmit connection acknowledgement."

In the next step S128, the communication terminal 40 transmits a command "Connection acknowledgcment," showing the establishment of communication, to the electronic camera 10 by wireless, and the program goes to the next step S130 "Response to keying received?". In step S130, it is judged whether the "↑ key" of the communication terminal 40 and the "↑ key" of the electronic camera 10 are pressed simultaneously. The electronic camera 10 transmits a command, showing that the "↑ key" is not pressed, in step S110 "Respond to no keying," and if the communication terminal 40 receives this, the program branches from step S130 to step S136 "END" to finish this subroutine.

In addition, the electronic camera 10 transmits a command, showing that the "↑ key" is pressed, in step S112 "Respond to keying," and if the communication terminal 40 receives this, the program branches from step S130 to step S132 "Transmit connection approval." In the next step S132 "Transmit connection approval," the communication terminal 40 transmits an enabling signal of communication connection to the electronic camera 10. After that, the electronic camera 10 and communication terminal 40 communicate with each other to establish each authentication in step S134 "Authentication procedure."

When the above-described authentication procedure is finished, the program completes connection processing with the electronic camera 10 in step S136 "END" to return to an original program routine.

As described above, the communication terminal 40 transmits an inquiry of whether the key is pressed to connecting equipment existing within a connection range by wireless communication by pressing the "↑ key" of the cross key, provided in the communication terminal 40, and "↑ key" of the cross key 8 provided in the electronic camera 10 simultaneously. If the communication terminal 40 receives from the connecting equipment such a response that the key is pressed, both equipment recognize each other by performing the procedure of mutual authentication, and can establish communication. In addition, a key to be operated is not limited to the "↑ key," but it can be made a command for executing the mutual authentication to press different keys so long as the keys are one or more predetermined operation keys.

Figure 10:
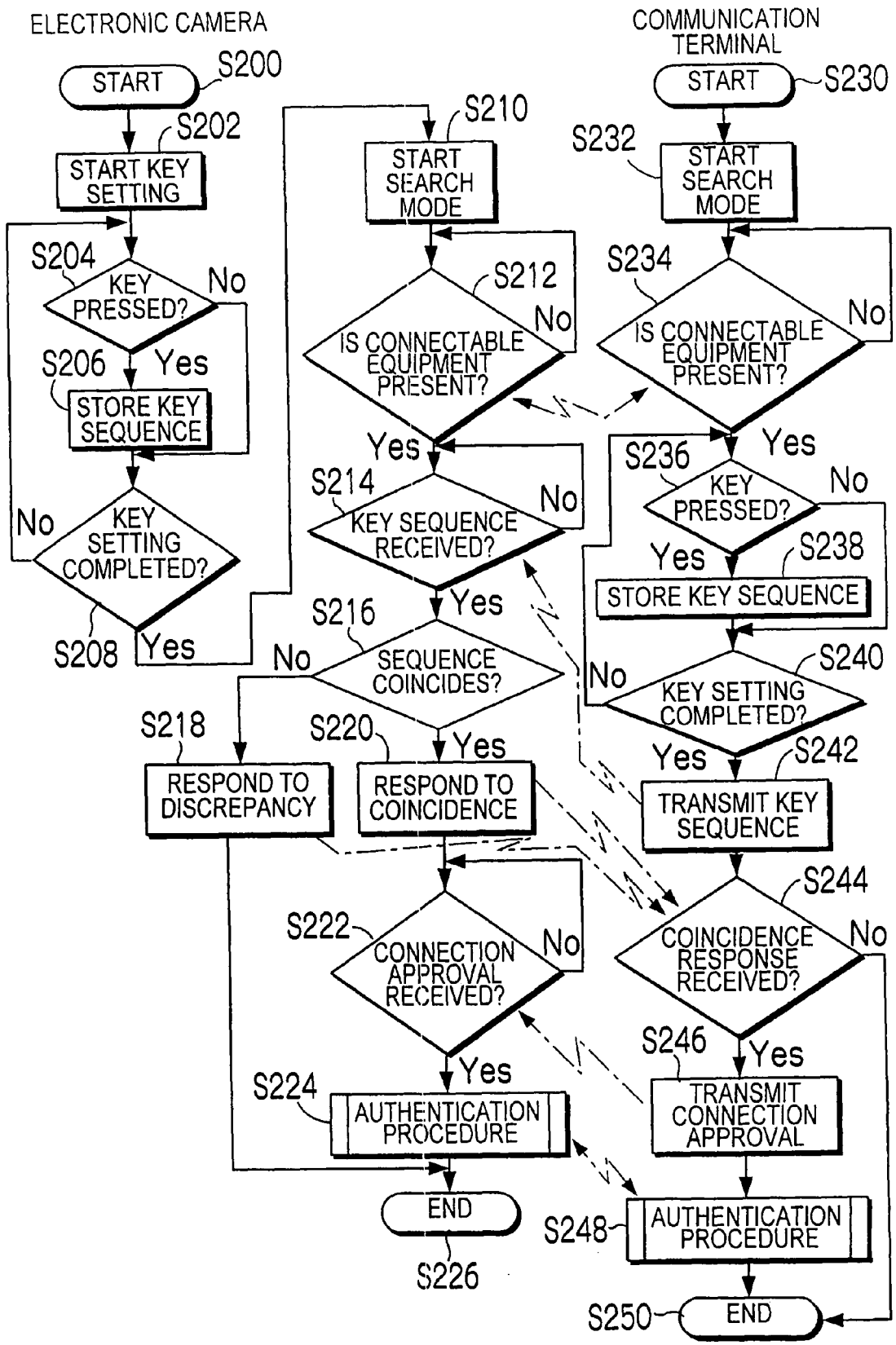
FIG. 10 is a flow chart showing another embodiment when an electronic camera and a communication terminal establish communication.

FIG. 10 is a flow chart showing another embodiment when the electronic camera 10 and communication terminal 40 establish communication.

When the electronic camera 10 and communication terminal 40 come within a communication range mutually, each equipment recognizes this, and the program of the electronic camera 10 branches step S200 "START." In the next step S202 "Start key setting," the program starts processing of setting the sequence of pressing keys corresponding to ID used for a user designating connecting equipment and the program establishing communication. At this time, it can be performed that a user selects and designates a desired item from among setting purposes, setting methods, and procedure by displaying them in the display device 32.

In step S204 "Key pressed?", it is judged whether any key provided in the input device 19 is pressed. If any key is not pressed, the program goes to step S208 "Key setting completed?". If any key is pressed, the program goes to step S206 "Store key sequence" to store the sequence of the key newly inputted, and goes to the next step S208.

In step S208, it is judged whether the setting of the sequence of pressing keys is finished. As a criterion of whether the setting of the sequence of pressing keys is finished, it can be also judged whether a key is pressed predetermined times, or it can be judged whether a finish of key setting is designated by timeout or a predetermined confirmation key being pressed. If it is judged that the key setting is finished, the program goes to step S210 "Start search mode," and if the key setting is not finished, the program branches step S204 to wait for the next key being pressed.

In next step S210, the data processing device 14 makes a radio wave, including a search signal, transmitted from the antenna 30 by a command, and the processing of searching for the communication terminal 40 is started. If the electronic camera 10 receives the search signal outputted from the communication terminal 40 in the next step S212 "Is connectable equipment present?", so as to establish communication, the electronic camera 10 receives a unique address from the communication terminal 40, newly joins a communication network, and starts processing for performing a connection handshake. At this time, it can be also performed that a user selects and designates desired equipment from in this display by displaying a communicating state and information such as equipment names of partner's connecting equipment and communication terminal in the display device 32.

In the next step S214 "Key sequence received?", the processing of waiting for the transmission of the information of the key sequence that a user inputted with the designating device 48 of the communication terminal 40 is performed. When the key sequence is received, the program goes to the next step S216 "Sequence coincides?".

In step S216, the data processing device 14 compares the sequence of keys inputted in the electronic camera 10 to the key sequence received from the communication terminal 40. If both key sequence do not coincide with each other, the program branches step S218 "Respond to discrepancy" to transmit a command, showing that the sequence of pressing keys is different, to the communication terminal 40, and goes to step S226 "END." If both key sequence coincide with each other in step S216, the program goes to step S220 "Respond to coincidence" to transmit a command, showing that both key sequence coincide with each other, to the communication terminal 40, and goes to step S222 "Connection approval received?".

In step S222, the electronic camera 10 performs processing of waiting for "Connection approval" signal with the electronic camera 10 that comes by wireless from the communication terminal 40. If "Connection approval" does not come, the program loops step S222, and if "Connection approval" comes, the program goes to the next step S224 "Authentication procedure" to perform communication relating to the authentication procedure. Further, in step S226 "END," the program completes connection processing with the communication terminal 40, and returns to an original program routine.

On the other hand, in a processing program of the communication terminal 40, when the electronic camera 10 and communication terminal 40 come within a communication range mutually, each equipment recognizes this, and the program of the electronic camera 10 branches step S230 "START." In the next step S232 "Start search mode," the CPU 62 activates the transmission and reception device 58, transmits a radio wave including a search signal from the wireless communication device 44, and starts the processing of searching for connecting equipment. If the communication terminal 40 receives the search signal outputted from the electronic camera 10 in the next step S234 "Is connectable equipment present," so as to establish communication, the communication terminal 40 recognizes the electronic camera 10 that newly joins a wireless communication network, assigns a unique address, and starts processing for performing connection handshake.

In the subsequent steps, the program starts the processing of inputting information corresponding to ID used for a user designating connecting equipment and the program establishing communication. At this time, it can be performed that a user selects and designates a desired item from among setting purposes, setting methods, and procedure by displaying them in the display device 32.

In step S236 "Key pressed?", it is judged whether any key provided in the designating device 48 is pressed. If any key is not pressed, the program goes to step S240 "Key setting completed?". If any key is pressed, the program goes to step S238 "Store key sequence" to store the sequence of the key newly inputted, and goes to the next step S240.

In step S240, it is judged whether the setting of the sequence of pressing keys is finished. As a criterion of whether the setting of the sequence of pressing keys is finished, it can be also judged whether a key is pressed predetermined times, or it can be judged whether a finish of key setting is designated by timeout or a predetermined confirmation key being pressed. If it is judged that the key setting is finished, the program goes to step S242 "Transmit key sequence," and if the key setting is not finished, the program branches step S236 to wait for the next key being pressed.

In step S242, the program executes the processing of transmitting the key sequence inputted to the electronic camera 10 that is connecting equipment, and goes to the next step S244 "Coincidence response received?". In step S244, the program performs the processing of receiving and judging a judgment result of the key sequence transmitted to the electronic camera 10, and changing a branching destination in the processing in the communication terminal 40. If contents of the command received are "Discrepancy," the program branches step S250 "END," and if the contents of the command received is "Coincidence," the program goes to the next step S246 "Transmit connection approval."

In the next step S246 "Transmit connection approval," the communication terminal 40 transmits an allowance signal of communication connection to the electronic camera 10. After that, the electronic camera 10 and communication terminal 40 communicate with each other to establish each authentication in step S248 "Authentication procedure."

When the above-described authentication procedure is finished, the program completes connection processing with the electronic camera 10 in step S250 "END" to return to an original program routine.

As described above, a user presses keys, provided in the communication terminal 40, in the key sequence set in the electronic camera 10 beforehand, and transmits information of this key sequence to the electronic camera 10. The electronic camera 10 responds about a judgment result of whether this key sequence coincides with the sequence set beforehand. If the communication terminal 40 receives this information and both sequence coincide with each other, it is possible to recognize each other and to establish communication. In addition, it can be performed that the key sequence is set to be easy to remember like pressing of the cross key in the order of "↑t, →, ↓, ←." In addition, a key to be operated is not limited to a specific key, but it can be made a command for executing the mutual authentication to press different keys so long as the keys are one or more predetermined operation keys.

Figure 11:
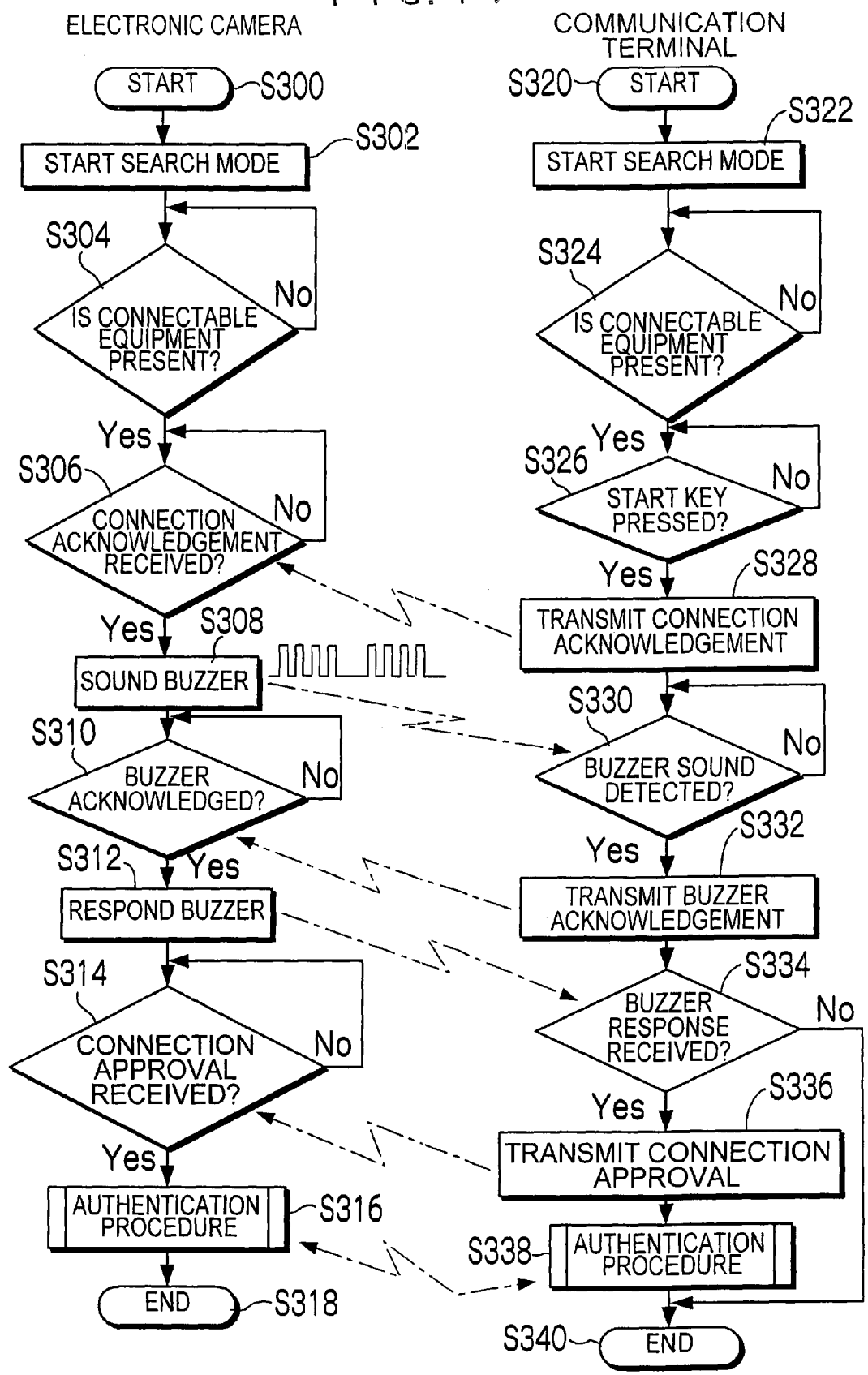
FIG. 11 is a flow chart showing still another embodiment when an electronic camera and a communication terminal establish communication.

FIG. 11 is a flow chart showing another embodiment when the electronic camera 10 and communication terminal 40 establish communication.

When the electronic camera 10 and communication terminal 40 come within a communication range mutually, each equipment recognizes this, and the program of the electronic camera 10 branches step S300 "START." In the next step S302 "Start search mode," commands of the data processing device 14 makes the antenna 30 transmit a radio wave including a search signal, and makes the processing of searching for the communication terminal 40 started.

If the electronic camera 10 receives the search signal outputted from the communication terminal 40 in step S304 "Is connectable equipment present?", so as to establish communication, the electronic camera 10 receives a unique address from the communication terminal 40, newly joins a communication network, and starts processing for performing connection handshake. At this time, it can be also performed that a user selects and designates desired equipment from in this display by displaying a communicating state and identification information such as equipment names of partner's connecting equipment and communication terminal in the display device 32.

In step S306 "Connection acknowledgement received?", the electronic camera 10 performs the processing of waiting for a "Connection acknowledgement" signal with the electronic camera 10 that comes by wireless from the communication terminal 40. If the "Connection acknowledgement" is not transmitted, the program returns to step S306 again, and loops step S306. If the "Connection acknowledgement" is transmitted, the program goes to the next step S308 "Sound buzzer" to sound a buzzer in constant intervals to the communication terminal 40. If the connecting equipment is the electronic camera 10, the program informs the communication terminal 40 by sounding a buzzer 13 used for self-timer or the like.

In step S310 "Buzzer acknowledged?", the program performs the processing of waiting for receiving "Buzzer acknowledgement" information showing that the communication terminal 40 receives buzzer sound given by the electronic camera 10. If the "Buzzer acknowledgement" is not received, the program returns to step S310 again, and performs loop processing. If the "Buzzer acknowledgement" is received, the program goes to step S312 "Respond to buzzer" to transmit "Respond to buzzer," showing that the electronic camera 10 receives "Buzzer acknowledgement," to the communication terminal 40.

Further, in the next step S314 "Connection approval received?", if the electronic camera 10 does not receive "Connection approval" from the communication terminal 40, the program returns to step S314 again, and loops step S314. If the electronic camera 10 receives "Connection approval" from the communication terminal 40, the program goes to the next step S316 "Authentication procedure" to perform communication relating to authentication procedure. Furthermore, in step S318 "END," the program completes communicative connection processing with the communication terminal 40, and returns to an original program routine.

On the other hand, in a processing program of the communication terminal 40, when the electronic camera 10 and communication terminal 40 come within a communication range mutually, each equipment recognizes this, and the program of the communication terminal 40 branches step S320 "START." In the next step S322 "Start search mode," the CPU 62 transmits a radio wave including a search signal from the wireless communication device 44, and starts processing of searching for communication terminal. At this time, it can be performed that a user selects and designates desired equipment from in this display by displaying information such as an equipment name of the electronic camera 10, which is communicating, and information such as names of other connecting equipment communicably existing within the communication range.

If the communication terminal 40 receives the search signal outputted from the electronic camera 10 in step S324 "Is connectable equipment present," so as to establish communication, the communication terminal 40 recognizes the communication terminal 40 that newly joins a communication network, assigns a unique address, and starts processing for performing connection handshake.

In step S326 "Start key pressed?", it is judged whether a start key provided in the designating device 48 is pressed. As this start key, a dedicated start key or "↑ key" of the cross key 8 can be assigned. If the "start key" is not pressed, the program returns to step S326 and loops step S326, and if the "start key" is pressed, the program goes to the next step S328 "Transmit connection acknowledgement."

In the next step S328, the (communication terminal 40 transmits a command "Connection acknowledgement," showing the establishment of communication, to the electronic camera 10 by wireless, and the program goes to the next step S330 "Buzzer sound detected?". If the communication terminal 40 does not detect the buzzer sound given by the electronic camera 10 in step S330, the program returns to step S330 again and loops step S330. If the communication terminal 40 detects the buzzer sound given by the electronic camera 10 in step S330, the program goes to step S332 "Transmit buzzer acknowledgement" to transmit information, showing reception of buzzer sound, to the electronic camera 10. Then, the program goes to the next step S334 "Buzzer response received?".

In step S334, if the communication terminal 40 receives "Respond to buzzer" information, which the electronic camera 10 transmits in step S312, and does not receive "Respond to buzzer," the program branches step S340 "END."

If the communication terminal 40 receives "Respond to buzzer," the program goes to the next step S336 "Transmit connection approval."

In the next step S336 "Transmit connection approval," the communication terminal 40 transmits an enabling signal of communication connection to the electronic camera 10. After that, the electronic camera 10 and communication terminal 40 communicate with each other to establish each authentication in step S338 "Authentication procedure."

When the above-described authentication procedure is finished, the program completes connection processing with the electronic camera 10 in step S340 "END" to return to an original program routine.

As described above, when a user selects desired connecting equipment from among information of connecting equipment displayed in the communication terminal 40, the connecting equipment selected gives buzzer sound. A microphone 52 of the communication terminal 40 detects this buzzer sound, and the communication terminal 40 inquires of equipment, existing in the communicative connection range by wireless communication, whether the equipment sounds a buzzer. If the communication terminal 40 receives the response of sounding a buzzer, it is possible to execute mutual authentication and to establish communication. In addition, if the buzzer sound is given from a plurality of connecting equipment, it can be performed to establish communication only with connecting equipment can access the communication terminal 40.

Figure 12:
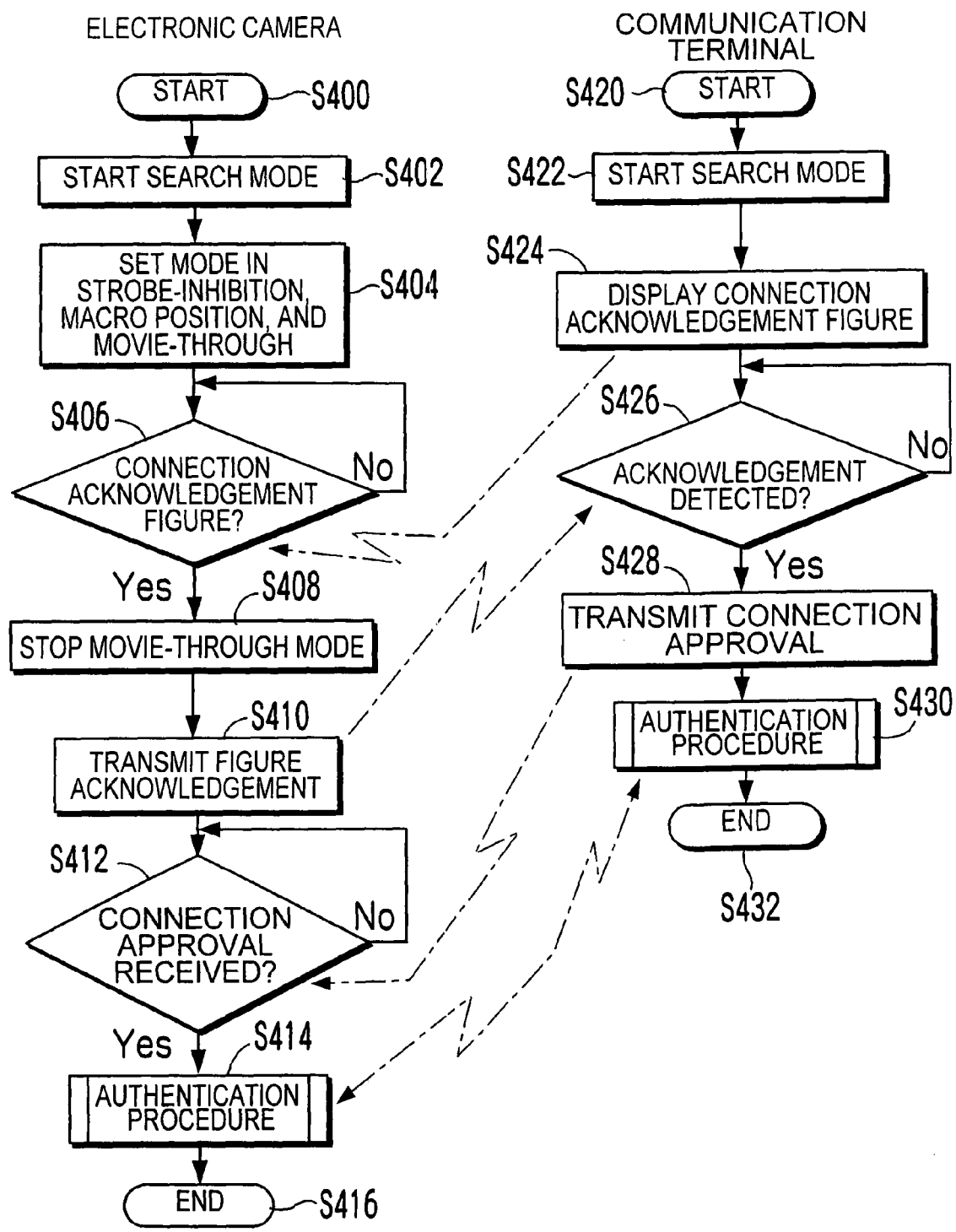
FIG. 12 is a flow chart showing a further embodiment when an electronic camera and a communication terminal establish communication.

FIG. 12 is a flow chart showing another embodiment when the electronic camera 10 and communication terminal 40 establish communication.

When the electronic camera 10 and communication terminal 40 come within a communication range mutually, each equipment recognizes this, and the program of the electronic camera 10 branches step S400 "START." In the next step S402 "Start search mode," commands of the data processing device 14 makes the antenna 30 transmit a radio wave including a search signal, and makes the processing of searching for the communication terminal 40 started.

Then, the program goes to the next step S404 "Set mode in strobe-inhibition, macro position, and movie-through," and goes to step S406 "Connection acknowledgement figure?" after setting an operation mode of the electronic-camera 10. In the next step S406, a user photographs "connection acknowledgement figures" displayed in the display device 46 of communication terminal 40 with the electronic camera 10. The electronic camera 10 photographs display patterns and a flash condition of display to recognize the communication terminal 40.

If the "connection acknowledgement figure" is recognized in step S406, the program goes to the next step S408 "Stop movie-through mode" to stop the movie-through mode set at the above-described S404. Then, in step S410 "Transmit figure acknowledgement." the electronic camera 10 transmits information, showing that a drawing displayed in the display device 46 is acknowledged, to the communication terminal 40, and the program goes to the next S412 "Connection approval received?".

In the next step S412 "Connection approval received?", if the electronic camera 10 does not receive "connection approval" from the communication terminal 40, the program returns to step S412 again and loops step S412. If the electronic camera 10 receives the "connection approval" from the communication terminal 40, the program goes to the next step S414 "Authentication procedure" to perform communication relating to authentication procedure. Further, in step S416 "END," the program completes communication connection processing with the communication terminal 40, and returns to an original program routine.

On the other hand, in a processing program of the communication terminal 40, when the electronic camera 10 and communication terminal 40 come within a communication range mutually, each equipment recognizes this, and the program of the communication terminal 40 branches step S420 "START." In the next step S422 "Start search mode," the CPU 62 transmits a radio wave including a search signal from the wireless communication device 44, and starts processing of searching for connecting equipment. At this time, it can be performed that a user selects and designates desired equipment from in this display by displaying information such as an equipment name of the electronic camera 10, which is communicating, and information such as names of other connecting equipment communicably existing within a communication range.

After completion of searching the connecting equipment, the program goes to the next step S424 "Display connection acknowledgement figure" to display predetermined display patterns in the display device 46, and goes to the next step S426 "Acknowledgement detected?". In step S426, the program performs the processing of waiting for a "figure acknowledgement" signal transmitted from the electronic camera 10. If the "figure acknowledgement" is not received at step S426, the program returns to step S426 and loops step S426 again, and if the "figure acknowledgement" is received, the program goes to the next step S428 "Transmit connection approval."

In the next step S428, the communication terminal 40 transmits an enabling signal of communication connection to the electronic camera 10. After that, the electronic camera 10 and communication terminal 40 communicate with each other to establish each authentication in step S430 "Authentication procedure."

When the above-described authentication procedure is finished, the program completes connection processing with the electronic camera 10 in step S432 "END" to return to an original program routine.

Figure 13:
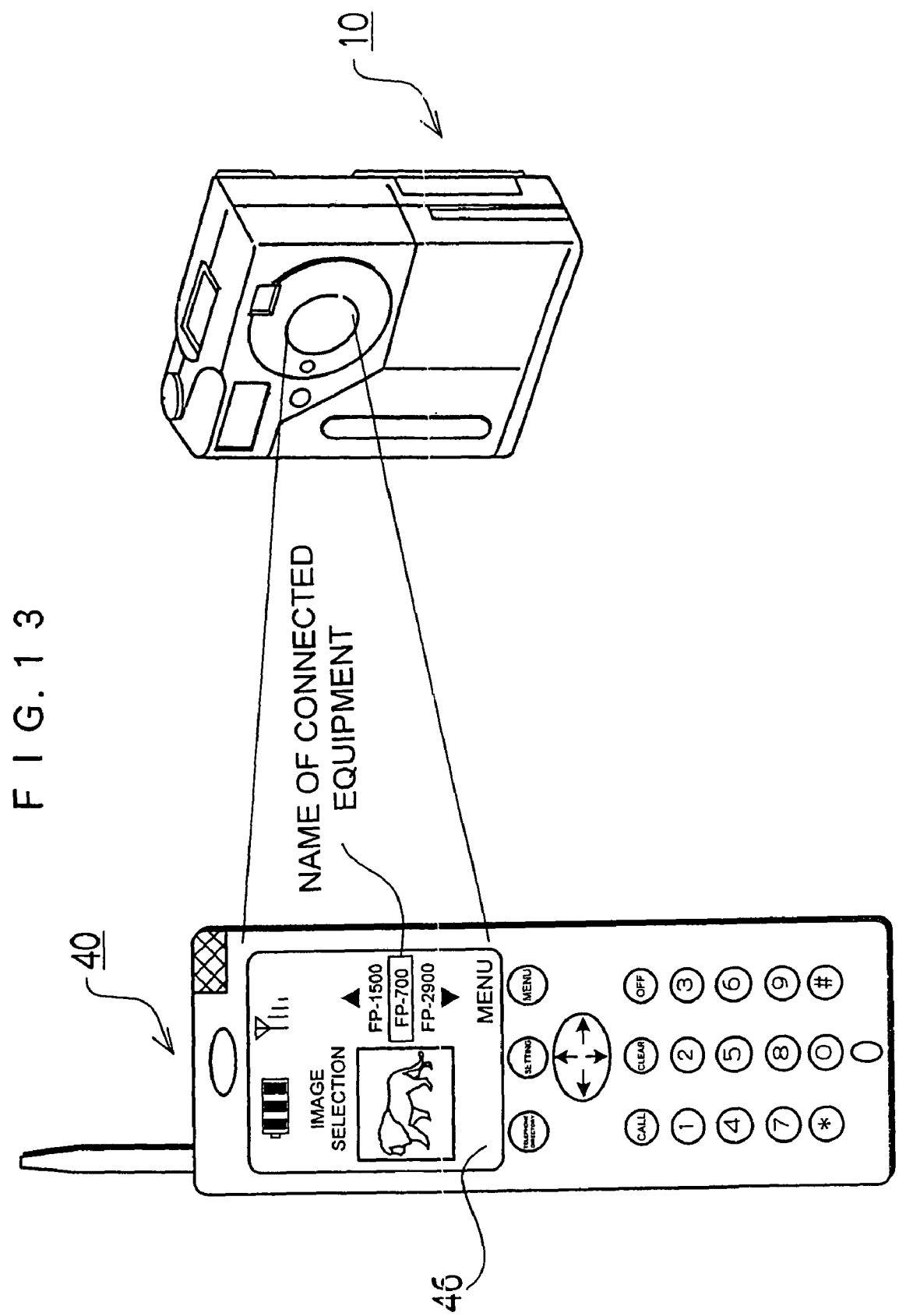
FIG. 13 is a drawing showing a state of taking a photograph of "acknowledgement figures," displayed on a display device of a communication terminal, with an electronic camera.

FIG. 13 is a drawing showing a state of taking a photograph of "acknowledgement figures," displayed on the display device 46 of the communication terminal 40, with the electronic camera 10.

As shown in the figure, by automatically setting a mode of the electronic camera 10 at an acknowledgement mode and recognizing "acknowledgement figures" displayed in the display device 46 of the communication terminal 40, it becomes possible to execute the procedure of mutual authentication and to establish communication. The acknowledgement figures can be character patterns or graphic patterns.

Figure 14:
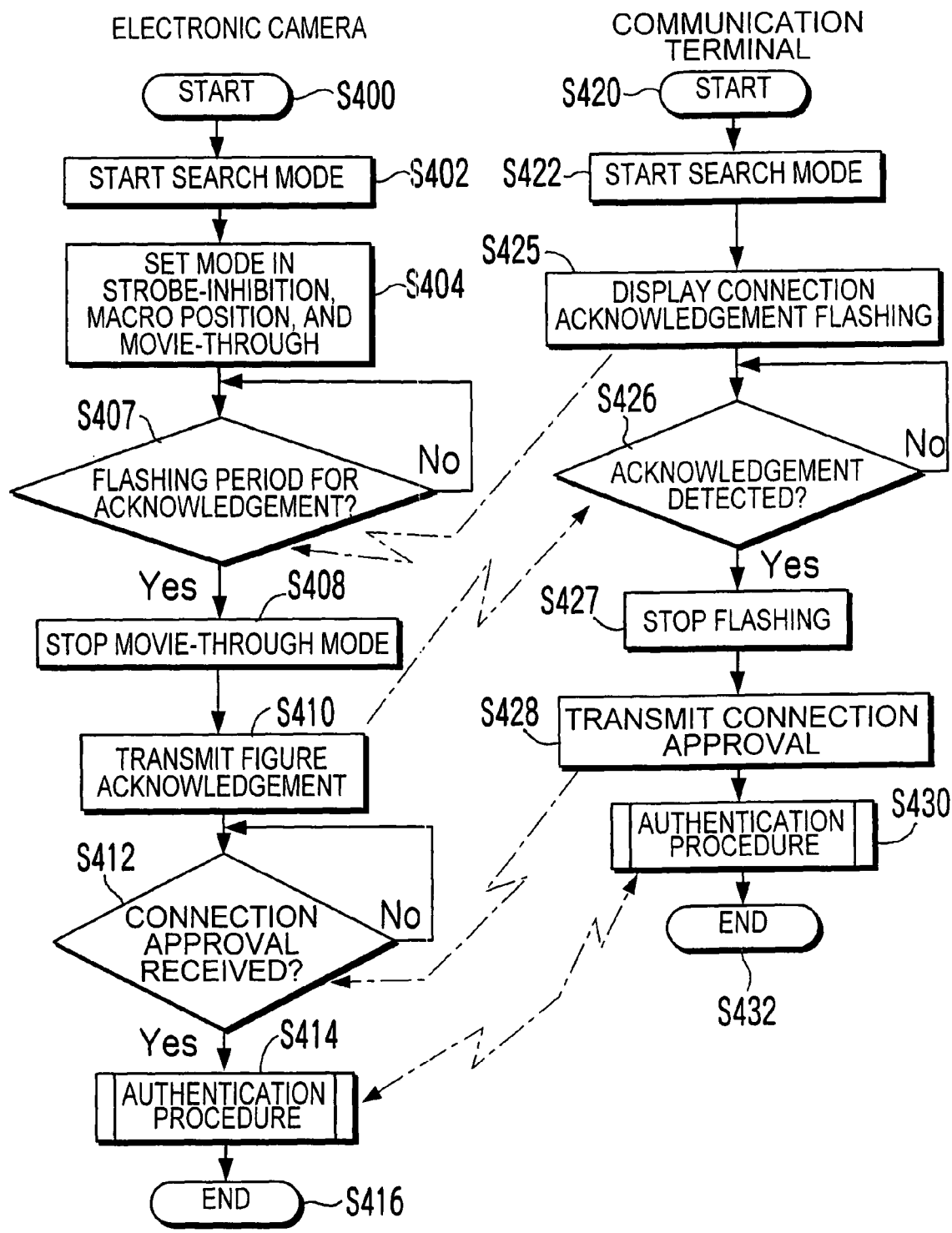
FIG. 14 is a flow chart showing a still further embodiment when an electronic camera and a communication terminal establish communication.

FIG. 14 is a flow chart showing another embodiment when the electronic camera 10 and communication terminal 40 establish communication as shown in FIG. 12. Although an acknowledgement method of connection shown in FIG. 12 is a method using "diagram recognition," an acknowledgement method of connection shown in FIG. 14 is a method using "flashing period recognition."

Description of the flow chart in the figure will be performed only about portions different from those in FIG. 12, and portions that are the same processing will be omitted.

Difference of this method from the processing program of the electronic camera 10 shown in FIG. 12 is that the electronic camera 10 photographs "flashing display for connection acknowledgement," displayed in the display device 46 in step S407 "Flashing period for acknowledgement?", and recognizes a flashing period instead of photographing display patterns or a flashing state of display displayed in the display device 46 and recognizing the communication terminal 40, which is executed in step S406 "Connection acknowledgement figure?" in FIG. 12. The subsequent processing is performed similarly to the processing shown in FIG. 12.

Difference of this method from the processing program of the communication terminal 40 shown in FIG. 12 is that display is blinked in a predetermined period in step S425 "Display connection acknowledgement flashing" and that the processing of stopping the display, having flashed in step S425, in step S427 "Stop flashing" in connection with acknowledgement detection in step S426 instead of displaying the "connection acknowledgement figures" in step S424 "Display connection acknowledgement figure" in FIG. 9.

By recognizing the flashing period displayed in the above-described display device 46, it becomes possible to execute the procedure of mutual authentication and to establish communication. The acknowledgement flashing display can be character patterns or graphic patterns.

Figure 15:
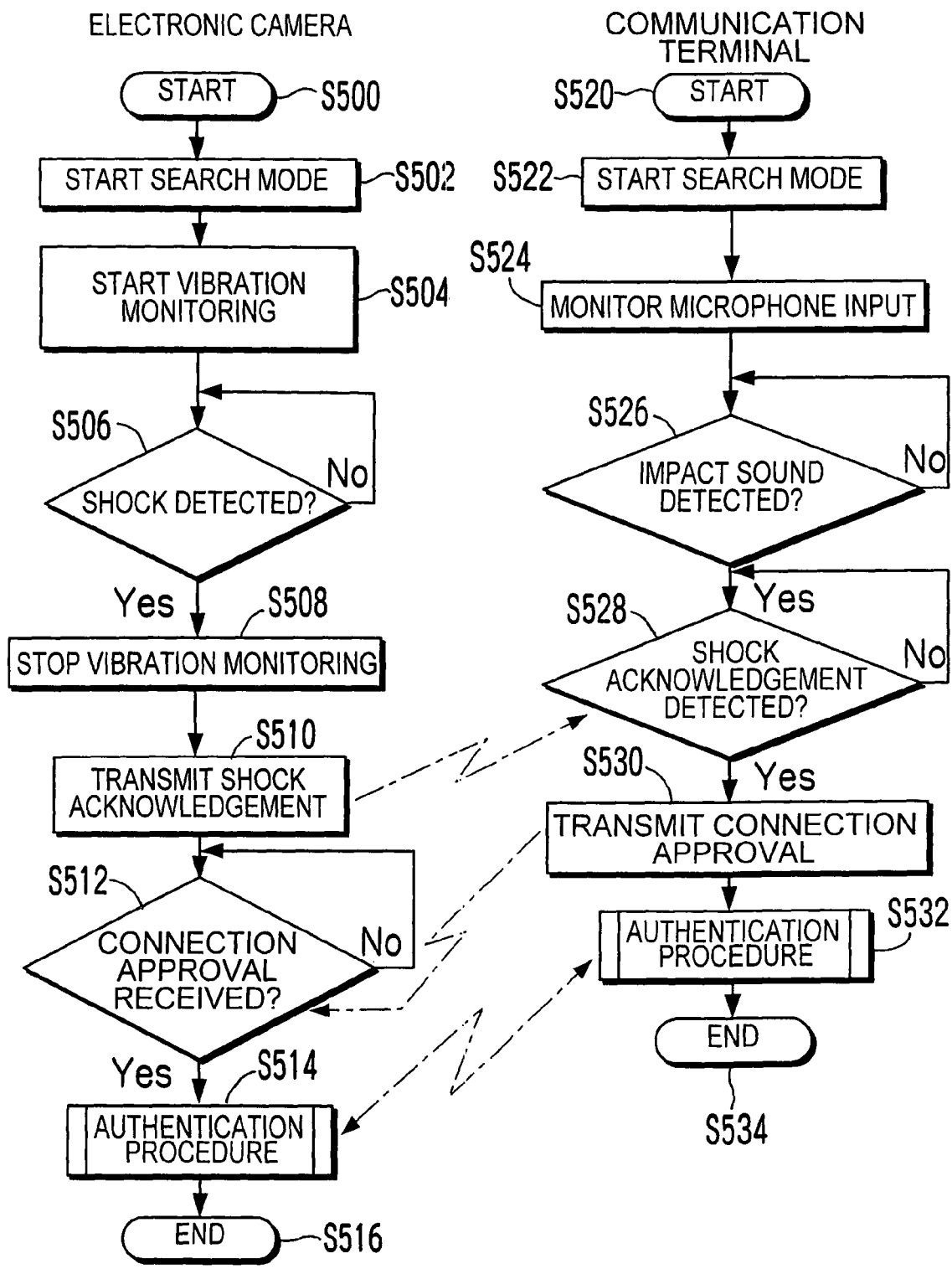
FIG. 15 is a flow chart showing another embodiment when an electronic camera and a communication terminal establish communication.

FIG. 15 is a flow chart showing another embodiment when the electronic camera 10 and communication terminal 40 establish communication.

When the electronic camera 10 and communication terminal 40 come within a communication range mutually, each equipment recognizes this, and the program of the electronic camera 10 branches step S500 "START." In the next step S502 "Start search mode," commands of the data processing device 14 makes the antenna 30 transmit a radio wave including a search signal, and makes the processing of searching for the communication terminal 40 started.

Then, in the next step S504 "Start vibration monitoring," the processing program of the electronic camera 10 enables the vibration detection device 15 and starts the processing of monitoring vibration data outputted from the vibration detection device 15. In the next step S506 "Shock detected?", the program sequentially monitors vibration data outputted from the vibration detection device 15 and judges whether a shock, which arises when the communication terminal 40 contacts with the electronic camera 10, is detected as vibration. If the shock is not detected, the program returns to step S506 again and loops step S506. If the shock is detected, the program goes to the next step S508 "Stop vibration monitoring" to disable the vibration detection device 15, and stops monitoring of vibration data.

In the next step S510 "Transmit shock acknowledgement," the program performs the processing of transmitting "shock acknowledgement" information, showing the shock detection, to the communication terminal 40 to go to the next step S512 "Connection approval received?".

In the next step S512 "Connection approval received?", if the electronic camera 10 does not receive "connection approval" from the communication terminal 40, the program returns to step S512 again and loops step S512. If the electronic camera 10 receives the "connection approval" from the communication terminal 40, the program goes to the next step S514 "Authentication procedure" to perform communication relating to the authentication procedure. Further, in step S516 "END," the program completes communication connection processing with the communication terminal 40, and returns to an original program routine.

On the other hand, in a processing program of the communication terminal 40, when the electronic camera 10 and communication terminal 40 come within a communication range mutually, each equipment recognizes this, and the program of the communication terminal 40 branches step S520 "START." In the next step S522 "Start search mode," the CPU 62 transmits a radio wave including a search signal from the wireless communication device 44, and starts processing of searching for communication terminal. At this time, it can be performed that a user selects desired equipment from in this display by displaying information such as an equipment name of the electronic camera 10, which is communicating, and information such as names of other connecting equipment communicably existing within a communication range.

When the search of connecting equipment is finished, the program goes to the next step S524 "Monitor microphone input" to start the processing of sequentially monitoring impact sound inputted from the microphone 52. Then, the program goes to the next step S526 "Impact sound detected?" to judges whether the impact sound having a predetermined frequency or volume is detected. If it is judged that the impact sound is not detected by the microphone 52, the program returns to step S526 again and loops step S526. If it is judged that the impact sound is detected by the microphone 52, the program goes to step S528 "Shock acknowledgement detected?".

In the next step S528 "Shock acknowledgement detected?", it is judged whether "Shock acknowledgement" is transmitted from the electronic camera 10. If it is judged that the "Shock acknowledgement" is not transmitted from the electronic camera 10, the program returns to step S528 again and loops step S528. If it is judged that the "Shock acknowledgement" is transmitted, the program goes to step S530 "Transmit connection approval."

In the next step S530, the communication terminal 40 transmits an enabling signal of communication connection to the electronic camera 10. After that, the electronic camera 10 and communication terminal 40 communicate with each other to establish each authentication in step S532 "Authentication procedure."

When the above-described authentication procedure is finished, the program completes connection processing with the electronic camera 10 in step S534 "END" to return to an original program routine.

As described above, by automatically setting the electronic camera 10 in a shock acknowledgement mode and contacting the electronic camera 10 with the communication terminal 40 lightly in extent of generating contact sound, the communication terminal 40 can detect the contact sound with the microphone 52. Also, the electronic camera 10 can detect shock by the contact with the vibration detection device 15 and executes mutual authentication to establish communication. In addition, as the contact detection device, a sensor for shake detection in taking a photography can be used, the detection of a change of conductivity and a change of capacitance can be used, and the detection of a change of distance between the electronic camera 10 and communication terminal 40 by using an automatic focus device can be used.

Figure 16:
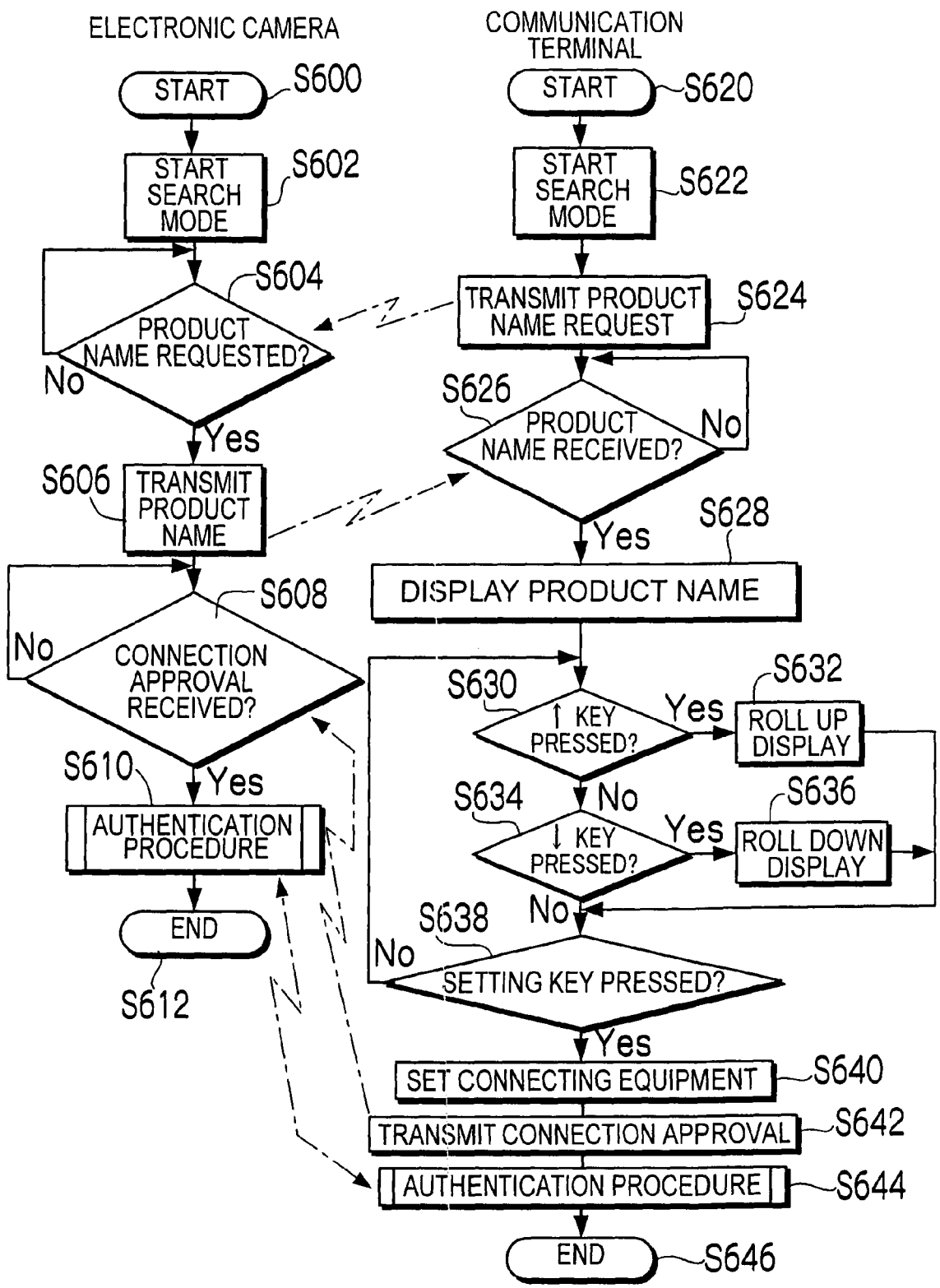
FIG. 16 is a flow chart showing still another embodiment when an electronic camera and a communication terminal establish communication.

FIG. 16 is a flow chart showing another embodiment when the electronic camera 10 and communication terminal 40 establish communication.

When the electronic camera 10 and communication terminal 40 come within a communication range mutually, each equipment recognizes this, and the program of the electronic camera 10 branches step S600 "START." In the next step S602 "Start search mode," commands of the data processing device 14 make the antenna 30 transmit a radio wave including a search signal, and make the processing of searching for the communication terminal 40 started. If the electronic camera 10 receives the search signal outputted from the communication terminal 40, so as to establish communication, the electronic camera 10 receives a unique address from the communication terminal 40, newly joins a communication network, and starts processing for performing connection handshake. At this time, it can be also performed that a user selects and designates a desired communication partner from in the following display by displaying a communicating state and information such as equipment names of partner's connecting equipment and communication terminal 40 in the display device 32.

In step S604 "Product name request," the electronic camera 10 performs the processing of waiting for coming of a send request of attributes such as a product name of the electronic camera 10 by wireless from the communication terminal 40. If "Product name request" does not come, the program branches step S604 again and loops step S604, and if "Product name request" comes, the program goes to the next step S606 "Transmit product name," and the electronic camera 10 transmits a product name of the electronic camera 10.

In the next step S608 "Connection approval received?", the program performs the processing of waiting for "Connection approval" with the electronic camera 10 that comes by wireless from the communication terminal 40. If "Connection approval" does not come, the program branches step S608 again and loops step S608, and if "Connection approval" comes, the program goes to the next step S610 "Authentication procedure" to perform communication relating to the authentication procedure. Further, in step S612 "END," the program completes connection processing with the communication terminal 40, and returns to an original program routine.

On the other hand, in a processing program of the communication terminal 40, when the electronic camera 10 and communication terminal 40 come within a communication range mutually, each equipment recognizes this, and the program of the communication terminal 40 branches step S620 "START." In the next step S622 "Start search mode," the CPU 62 transmits a radio wave including a search signal from the wireless communication device 44, and starts processing of searching for communication terminal. At this time, it can be performed that a user selects and designates desired equipment from in this display by displaying information such as an equipment name of the electronic camera 10, which is communicating, and information such as names of other connecting equipment communicably existing within the communication range.

In step S624 "Transmit product name request," the communication terminal 40 requests the electronic camera 10 to transmit attributes such as a product name by wireless. Furthermore, in the next step S626 "Product name received?", the communication terminal 40 performs processing of waiting for the reception of information about the product name of the electronic camera 10 transmitted from the electronic camera 10. If the "product name" is not received, the program branches step S626 again, and performs loop processing. If the "product name" is received, the program goes to step S628 "Display product name."

In the next S628 "Display product name," the program displays identification information such as appearance and names of connecting equipment, which are stored in the PROM 64, in the display device 46.

Figure 17:
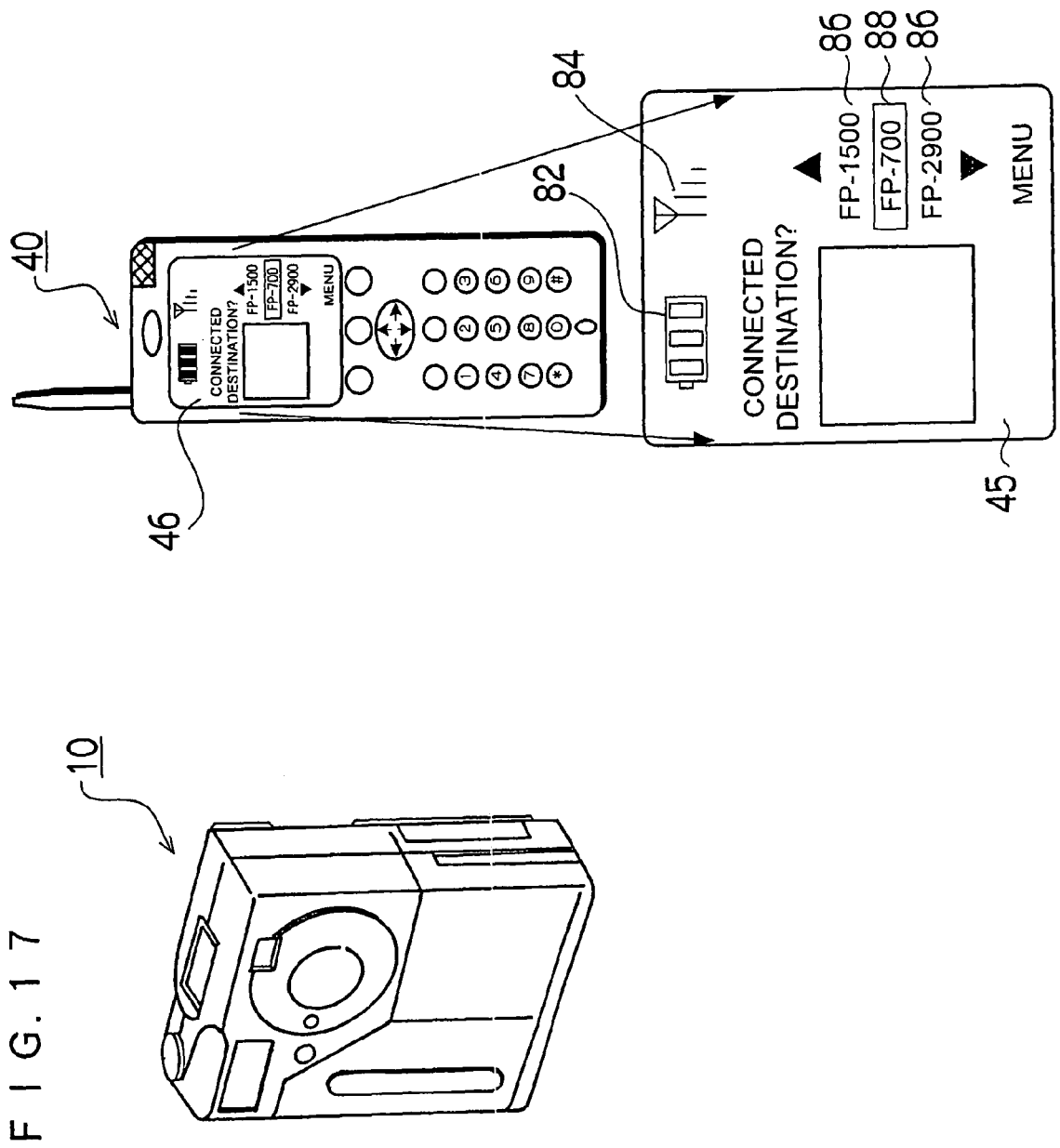
FIG. 17 is a drawing showing the display of connection equipment information displayed on a display device of a communication terminal.

FIG. 17 is a drawing showing the display 45 of identification information of connecting equipment that is displayed on the display device 46 of the communication terminal 40.

According to the drawing, in the display device 46 of the communication terminal 40, battery available capacity display 82 showing the available capacity of the battery which is a power supply of the communication terminal 40, reception radio field intensity display 84 displaying reception radio field intensity of wireless transmission, name display 86, 86, . . . , of connecting equipment, and reversed display 88 at the time of selecting the electronic camera 10 that is the connecting equipment are displayed.

In the next step S630 "↑ key pressed?", it is judged whether "↑ key" provided in the designating device 48 is pressed. If "↑ key" is pressed, the program goes to step S632 "Roll up display" to move the reversed display 88, displayed in the display device 46, to the name display 86 of the connecting equipment that is upper in one line. Further, when the reversed display 88 completely moves, the program goes to step S638 "Setting key pressed?".

If it is judged that "↑ key" is not pressed in step S630, the program goes to the next step S634 "↓ key pressed?", here, it is judged whether "↓ key" provided in the designating device 48 is pressed. If "↓ key" is pressed, the program goes to step S636 "Roll down display" to move the reversed display 88, displayed in the display device 46, to the name display 86 of the connecting equipment that is lower in one line, and specifies the connecting equipment. Further, when the reversed display 88 completely moves, the program goes to step S638 "Setting key pressed?".

In the next step S638, it is judged whether the "setting key" provided in the designating device 48 is pressed. In step S638, if it is judged that the "Setting key" is not pressed, the program branches the former step S630 "↑ key presses?". If the "Setting key" is pressed, the program goes to step S640 "Set connecting equipment" to set constants, flags, and parameters relating to a model of the connecting equipment.

In the next step S642 "Transmit connection approval," the communication terminal 40 transmits an enabling signal of communication connection to the electronic camera 10. After that, the electronic camera 10 and communication terminal 40 communicate with each other to establish each authentication in step S644 "Authentication procedure." Further, the communication continues.

When the above-described authentication procedure is finished, the program completes connection processing with the electronic camera 10 in step S646 "END" to return to an original program routine.

As described above, when a user sets the electronic camera 10 in an acknowledgement mode and enters into a communication range with the communication terminal 40, names of equipment, which are connectable, in the display device 46 of communication terminal 40. If the user selects and designates connecting equipment by using the designating device 48 such as a cross key, the program can execute the procedure of mutual authentication to establish communication.

Figure 18:
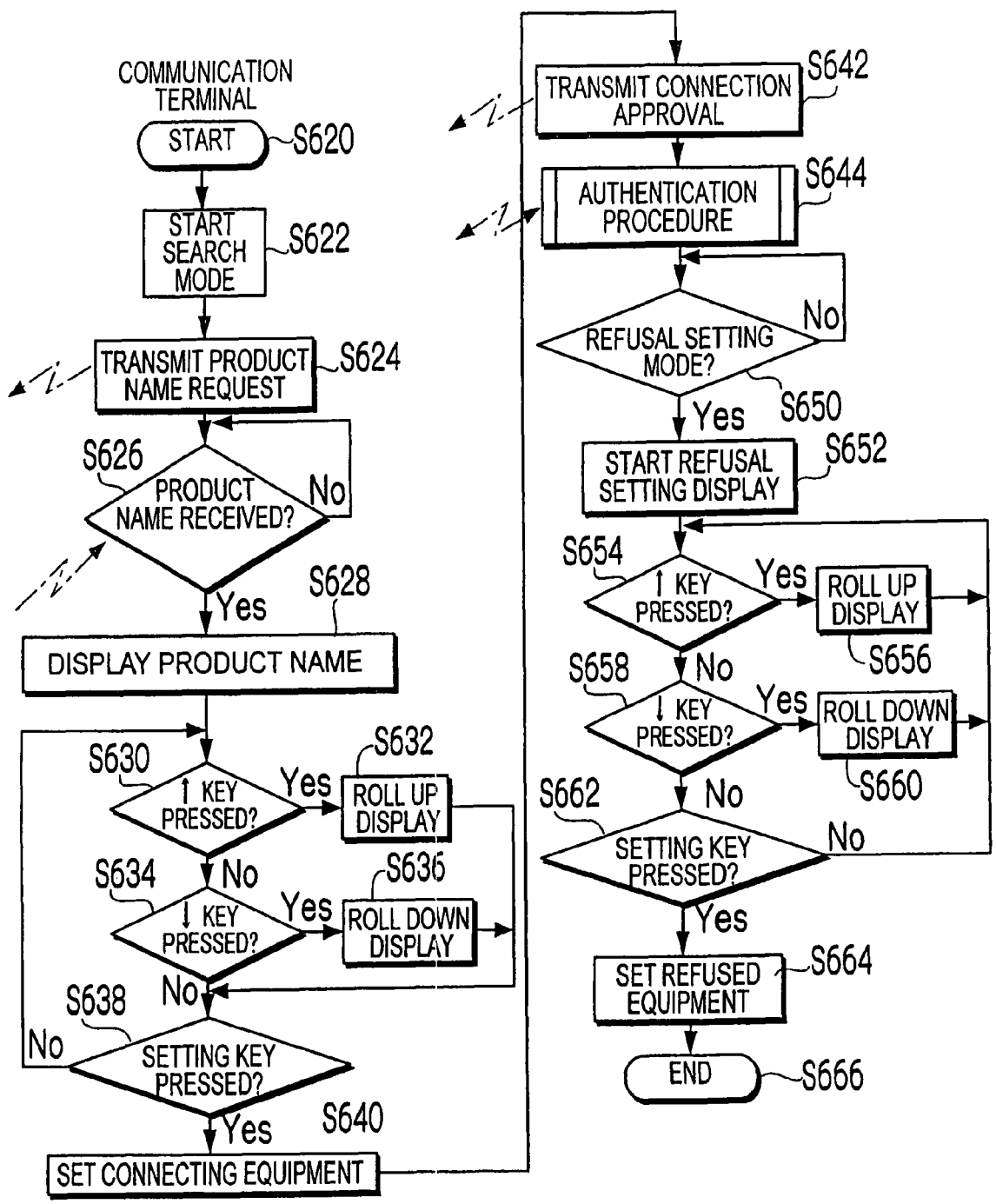
FIG. 18 is a flow chart showing, a further embodiment when an electronic camera and a communication terminal establish communication.

FIG. 18 is a flow chart showing another embodiment when the electronic camera 10 and communication terminal 40 establish communication.

The embodiment in FIG. 18 can designate the inhibition of wireless communicative connection by adding an inhibitive connection refusal-setting mode to the program in the communication terminal 40 shown in FIG. 16. Therefore, the description of the same flow as the flow described in the embodiment in FIG. 16 is omitted, and only the different flow will be described hereafter.

When the authentication procedure between the electronic camera 10 and communication terminal 40 is finished in step S644 "Authentication procedure," the program goes to the next step S650 "Refusal setting mode?".

In step S650, it is judged whether the refusal-setting mode is designated from the designating device 48. At this time, it is recommended to inform a user of setting purposes, setting methods, and procedure by displaying them in the display device 46. If the refusal-setting mode is not designated in step S650, the program goes to step S650 again, and performs loop processing. If the refusal setting mode is designated, the program goes to the next step S652 "Start refusal setting display" to display identification information such as appearance and names of connecting equipment, which are stored in the PROM 64, in the display device 46.

Figure 19:
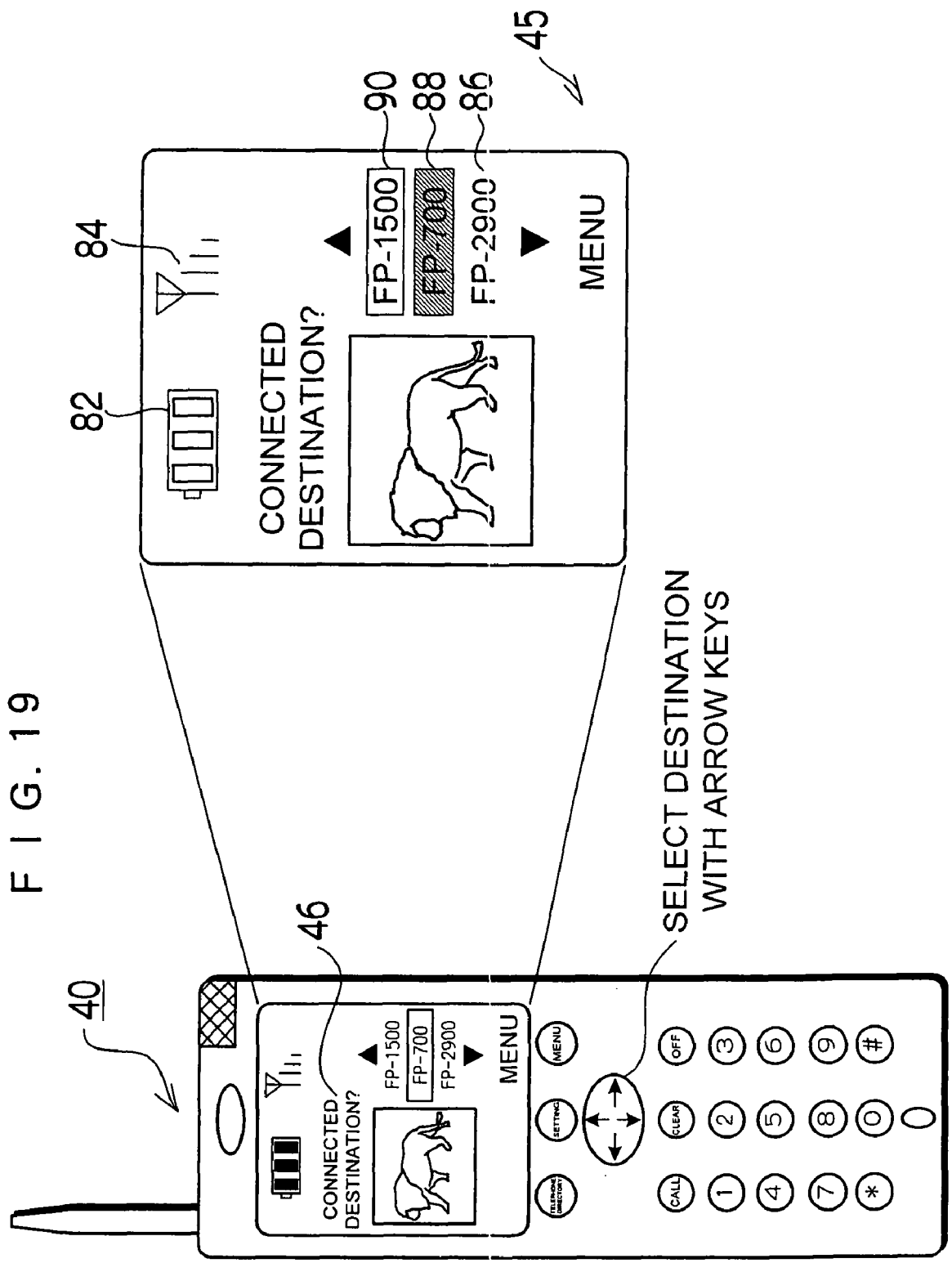
FIG. 19 is a drawing showing the display of connection equipment information displayed on a display device of a communication terminal.

FIG. 19 is a drawing showing, the display 45 of identification information of connecting equipment that is Displayed on the display device 46 of the communication terminal 40.

According to the drawing, in the display device 46 of the communication terminal 40, battery available capacity display 82 showing the available capacity of the battery which is a power supply of the communication terminal 40, reception radio field intensity display 84 displaying reception radio field intensity of wireless transmission, name display 86, 86, . . . of connecting equipment, reversed display 88 at the time of selecting the electronic camera 10 that is the connecting equipment, and connection refusal equipment display 90 where names of connection refusal equipment are enclosed by frames are displayed.

In the next step S654 "↑ key pressed?", it is judged whether "↑ key" provided in the designating device 48 is pressed. If "↑ key" is pressed, the program goes to step S656 "Roll up display" to move the connection refusal equipment display 90, displayed in the display device 46, to the name display 86 of the connecting equipment that is upper in one line. Further, when the connection refusal equipment display 90 completely moves, the program goes to step S662 "Setting key pressed?".

If it is judged that "↑ key" is not pressed in step S662, the program goes to the next step S658 "↓ key pressed?", here, it is judged whether "↓ key" provided in the designating device 48 is pressed. If "↓ key" is pressed, the program goes to step S660 "Roll down display" to move the connection refusal equipment display 90, displayed in the display device 46, to the name display 86 of the connecting equipment that is lower in one line, and specifies the connection refusal equipment. Further, when the connection refusal equipment display 90 completely moves, the program goes to step S662 "Setting key pressed?".

In the next step S662, it is judged whether the "setting key" provided in the designating device 48 is pressed. In step S662, if it is judged that the "Setting key" is not pressed, the program branches the former step S654 "↑ key presses?". If the "setting key" is pressed, the program goes to step S664 "Set refused equipment" to set that the communication equipment will not connect to the specified connecting equipment, and goes to the next step S666 "END" to return to the calling program routine.

Figure 20:
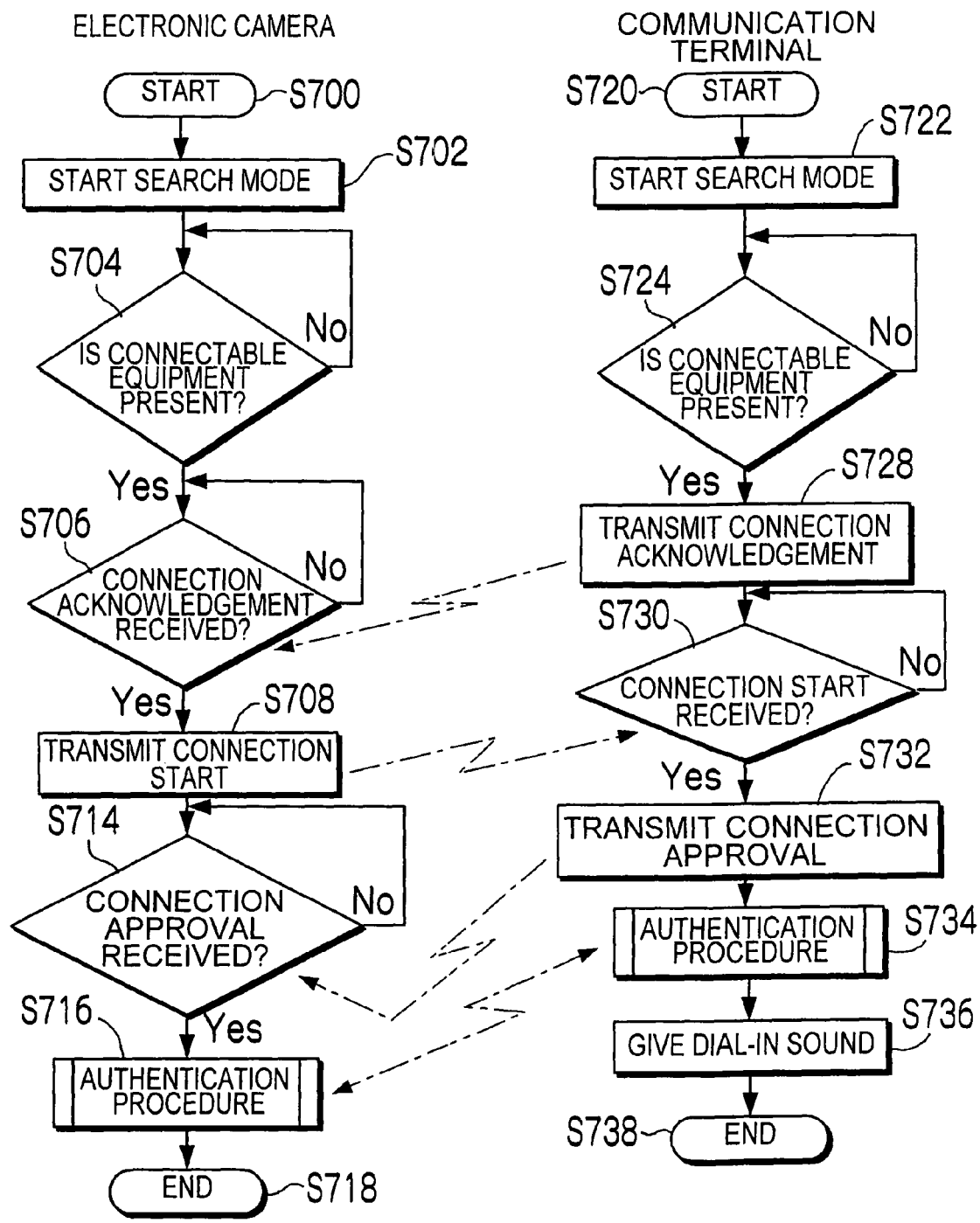
FIG. 20 is a flow chart showing a still further embodiment when an electronic camera and a communication terminal establish communication.

FIG. 20 is a flow chart showing another embodiment when the electronic camera 10 and communication terminal 40 establish communication.

When the electronic camera 10 and communication terminal 40 come within a communication range mutually, each equipment recognizes this, and the program of the electronic camera 10 branches step S700 "START." In the next step S702 "Start search mode," commands of the data processing device 14 makes the antenna 30 transmit a radio wave including a search signal, and makes the processing of searching for the communication terminal 40 started.

If the electronic camera 10 receives the search signal outputted from the communication terminal 40 in step S704 "Is connectable equipment present?", so as to establish communication, the electronic camera 10 receives a unique address from the communication terminal 40, newly joins a communication network, and starts processing for performing connection handshake. At this time, it can be also performed that a user selects and designates desired equipment from in this display by displaying a communicating state and identification information such as equipment names of destination's connecting equipment and communication terminal in the display device 32.

In the next step S706 "Connection acknowledgement received?", the electronic camera 10 performs processing of waiting for a "Connection acknowledgement" signal with the electronic camera 10 that comes by wireless from the communication terminal 40. If "Connection acknowledgement" is not transmitted, the program returns to step S706 again and loops step S706, and if "Connection acknowledgement" is transmitted, the program goes to the next step S708 "Transmit connection start."

In the next step S708 "Transmit connection start," the electronic camera 10 transmits a request command for performing "Connection start" to the communication terminal 40 so as to automatically perform mutual authentication, and the program goes to step S714 "Connection approval received?".

In the next step S714 "Connection approval received?", if the electronic camera 10 does not receive "Connection approval" from the communication terminal 40, the program returns to step S714 again and loops step S714. If the electronic camera 10 receives "Connection approval" from the communication terminal 40, the program goes to the next step S716 "Authentication procedure" to perform communication relating to authentication procedure. Further, in step S718 "END," the program completes connection processing with the communication terminal 40, and returns to the calling program routine.

On the other hand, in a processing program of the communication terminal 40, when the electronic camera 10 and communication terminal 40 come within a communication range mutually, each equipment recognizes this, and the program of the communication terminal 40 branches step S720 "START." In the next step S722 "Start search mode," the CPU 62 transmits a radio wave including a search signal from the wireless communication device 44, and starts processing of searching for communication terminal. At this time, it can be performed that a user selects and designates a desired communications partner from in this display by displaying information such as an equipment name of the electronic camera 10, which is communicating, and information such as names of other connecting equipment communicably existing within a communication range.

If the communication terminal 40 receives the search signal outputted from the electronic camera 10 in step S724 "Is connectable equipment present," so as to establish communication, this communication terminal 40 recognizes the communication terminal 40 that newly joins a communication network, assigns a unique address, and starts processing for performing connection handshake.

In the next step S728, the communication terminal 40 transmits a command "Connection acknowledgement," showing the establishment of communication, to the electronic camera 10 by wireless, and the program goes to the next step S730 "Connection start received?". In step S730, the program performs the processing of waiting for the request command of the "connection start" is transmitted from the communication terminal 40. If the electronic camera 10 transmits a command demanding the "connection start" in step S708 "Transmit connection start" and the communication terminal 40 receives this, the program goes from step S730 to step S732 "Transmit connection approval."

In the next step S732 "Transmit connection approval," the communication terminal 40 transmits an enabling signal of communication connection to the electronic camera 10. After that, the electronic camera 10 and communication terminal 40 communicate with each other to establish each authentication in step S734 "Authentication procedure."

When the above-described authentication procedure is finished, the program informs a user of the establishment of communicative connection by the communication terminal 40 giving dial-in sound from the speaker 50 in step S736 "Give dial-in sound." Then, the program goes to S738 "END" to complete connection processing with the electronic camera 10, and returns to the calling program routine.

In the above-described explanation, an example is explained, the example that a user is informed of the establishment of communication between the electronic camera 10 and communication terminal 40 by the sound given from the speaker 50, but the present invention is not limited to this. Thus, a user can be also informed by display, lighting of display, flashing, vibration, or the like.

Figure 21:
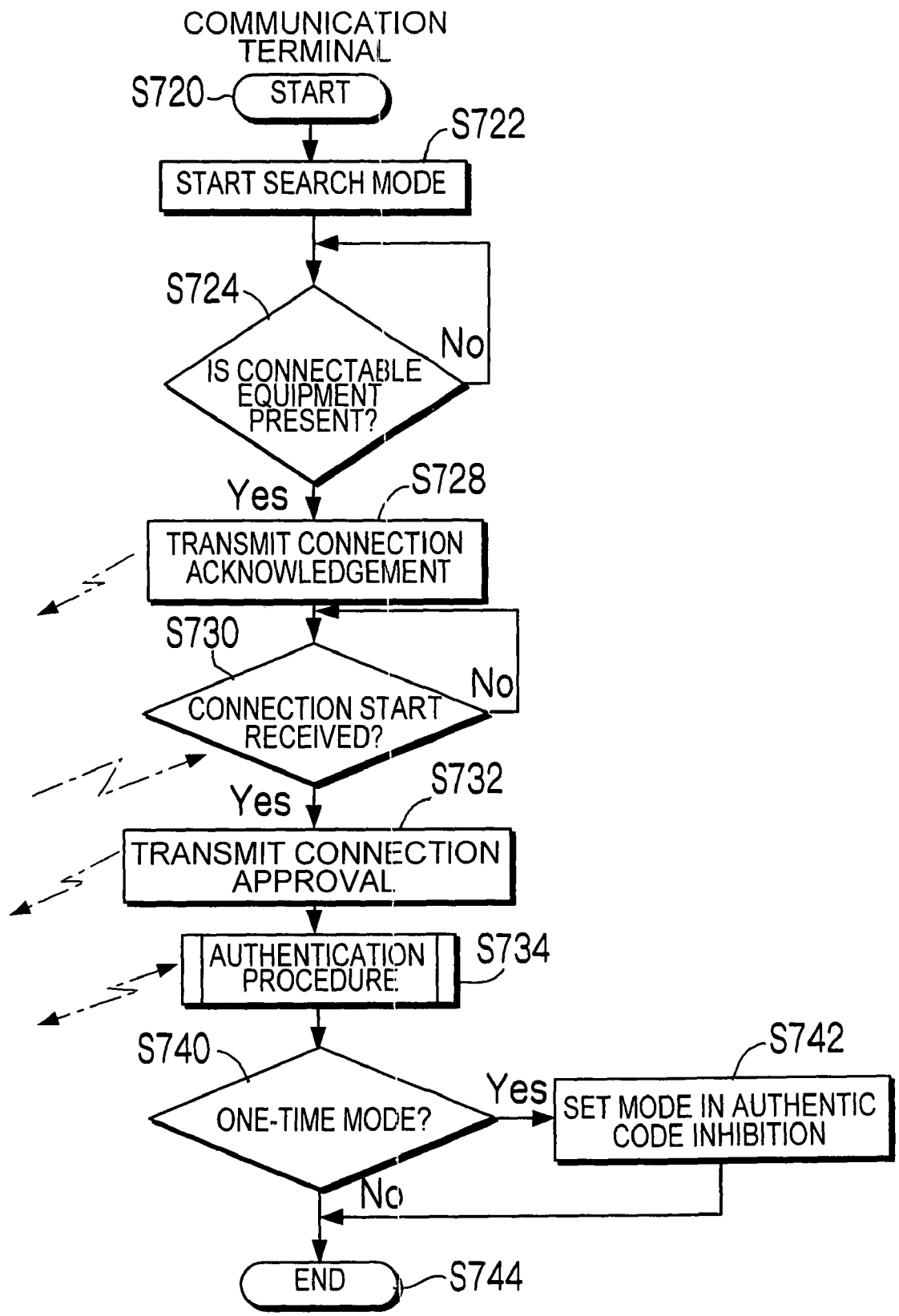
FIG. 21 is a flow chart showing another embodiment when an electronic camera and a communication terminal establish communication.

FIG. 21 is a flow chart showing another embodiment when the electronic camera 10 and communication terminal 40 establish communication as shown in FIG. 20. If communication is established with the method shown in FIG. 20, the electronic camera 10 retains the authentication code, but according to the method shown in FIG. 21, it is possible to set a "one-time mode" after the establishment of communication, and hence this is characterized in providing the mode of performing one-time mutual authentication. If such a "one-time mode" is set, this is effective in a case that subsequent communication is unnecessary so long as information is transferred in one-time connection like commercial information or the like, and hence it is possible to prevent unnecessarily subsequent connection processing.

Description of the flow chart in the figure will be performed only about portions different from those in FIG. 20, and portions that are the same processing will be omitted.

Difference of this program from the processing program of the electronic camera 10 shown in FIG. 20 is a portion of setting the one-time mode after step S734 "Authentication procedure" in FIG. 20. When the authentication procedure of the electronic camera 10 is finished in step S734, the program goes to decision step S740 "One-time mode?". Here, the program performs the display of setting the "one-time mode" in the display device 46 of the communication terminal 40, and a user performs the setting of the "one-time mode" by using the designating device 48. If the setting of the "one-time mode" is performed in step S740, the program goes to step S742 "Set mode in authentic code inhibition," performs the setting of releasing the authentication code after the first time communication to go to step S744 "END." If the setting of the "one-time mode" is not performed in step S740, the program directly goes to step S744 "END," and completes connection processing with the electronic camera 10 to return to the calling program routine.

Figure 22:
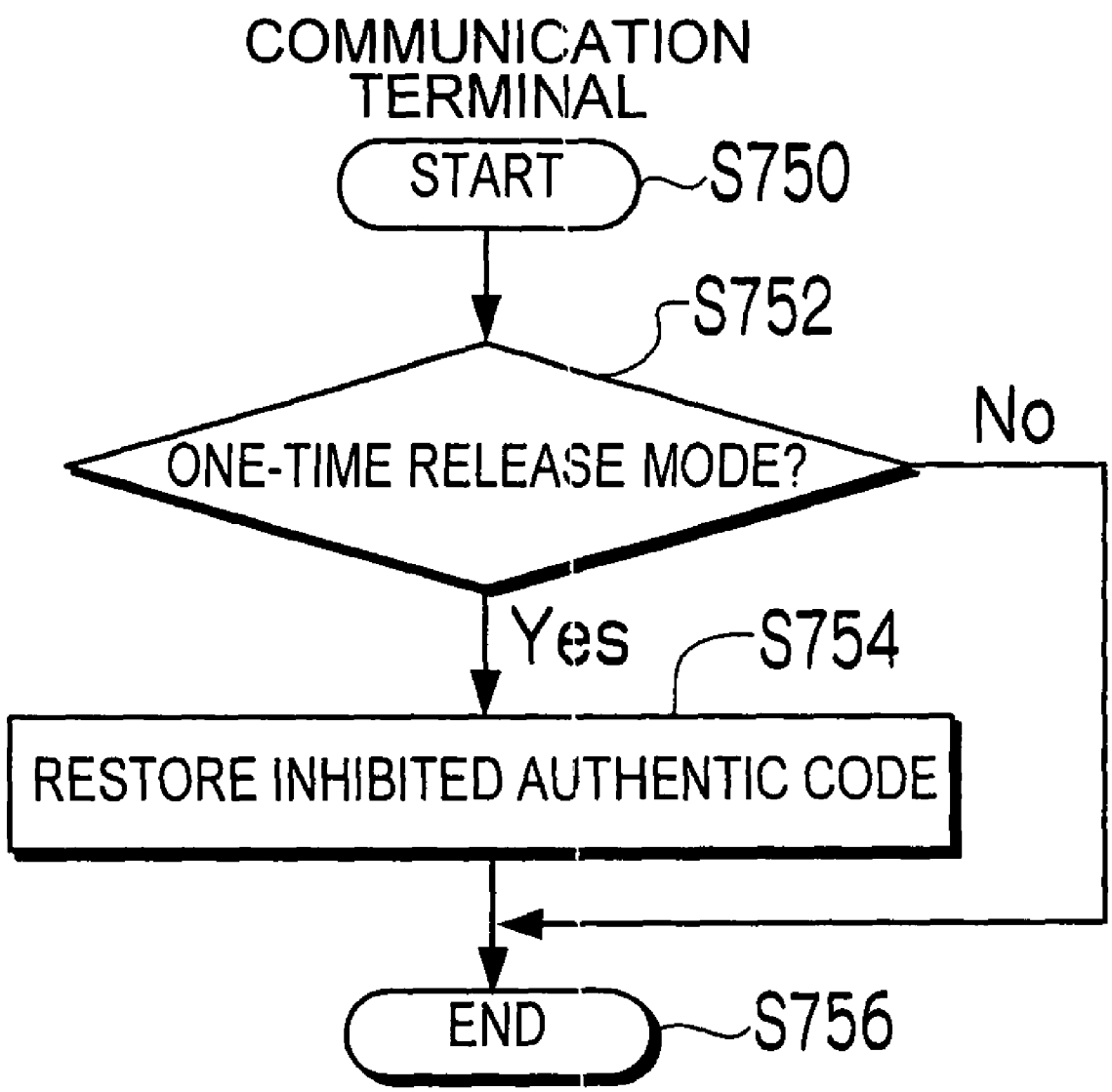
FIG. 22 is a flow chart showing still another embodiment when an electronic camera and a communication terminal establish communication.

FIG. 22 is a flow chart of continuing or releasing the "one-time mode" in the communication terminal 40.

If the setting of continuing or releasing the "one-time mode" is designated, the program jumps to step S750 "START." In the next step S752 "One-time release mode?", it is judged whether the designation by user's input is the "one-time release mode." If the designation is not the "one-time release mode," the program branches step S756 "END." If the designation is the "one-time release mode," the program goes to step S754 "Restore inhibited authentic code" to restore the authentic code, set in step S742 in FIG. 21, and perform the processing of establishing communication. Further, the program returns to the calling program.

Figure 23:
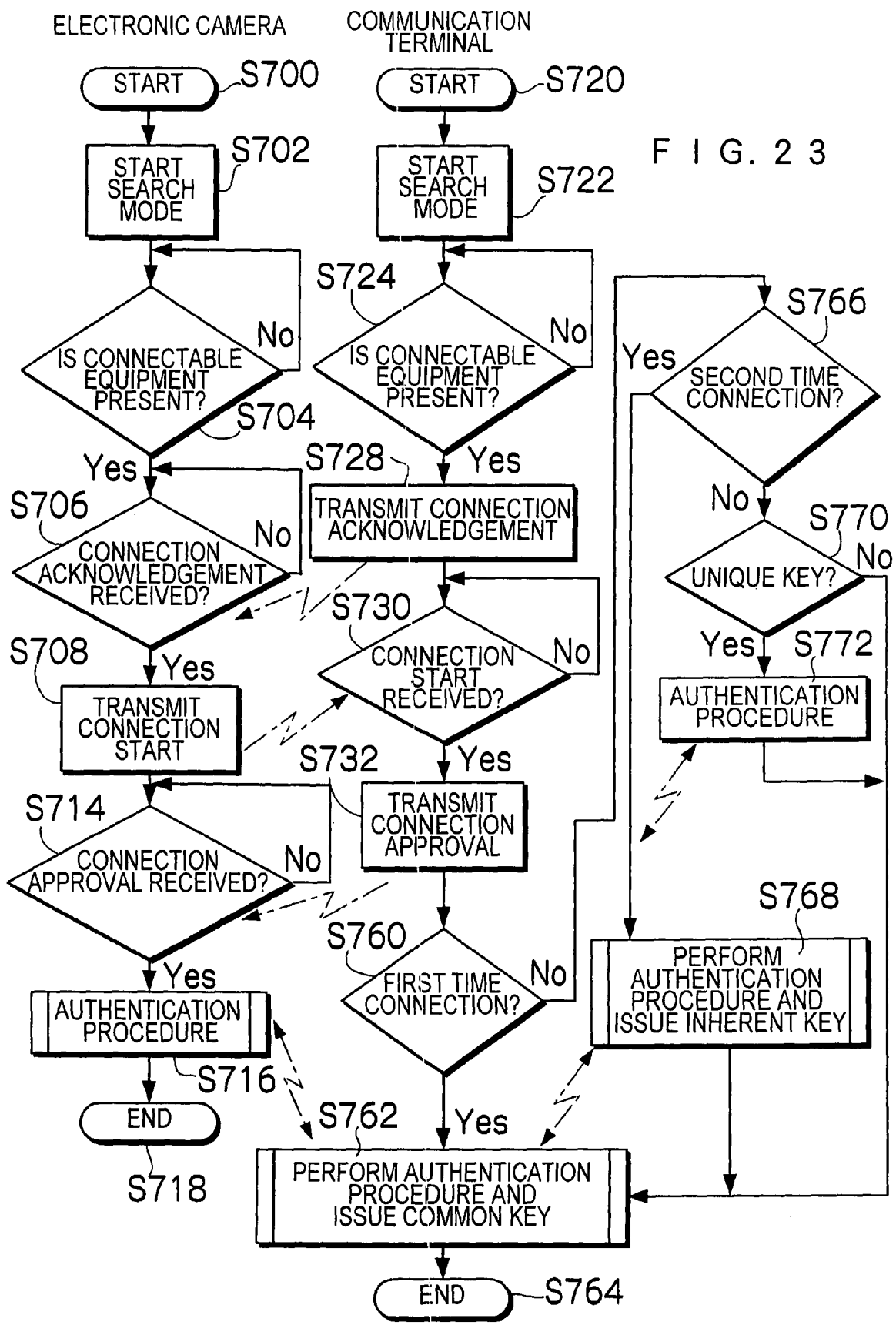
FIG. 23 is a flow chart showing a further embodiment when an electronic camera and a communication terminal establish communication.

FIG. 23 is a flow chart showing another embodiment when the electronic camera 10 and communication terminal 40 establish communication as shown in FIG. 20. If communication is established with the connection method shown in FIG. 20, the communication terminal 40 gives dial-in sound and recognizes connection. Nevertheless, with the connection method shown in FIG. 23, a common key is made user's identification information at the time of authentication procedure after the first time communicative connection, and a unique key is issued at the time of the authentication procedure after the second time communicative connection and is made user's identification information.

Since the flow of the processing program of the electronic camera 10 that is shown in FIG. 23 is the same as the flow shown in FIG. 20, description will be omitted.

Description of the flow chart of the communication terminal 40 in FIG. 23 will be performed only about portions different from those in FIG. 20, and portions that are the same processing will be omitted. In step S732 "Transmit connection approval," if the communication terminal 40 transmits "connection approval" to the electronic camera 10, the program goes to the next decision step S760 "First time connection?". In step S760, it is judged whether present connection is the first time connection. If the present connection is the first time, the program goes to step S762 "Perform authentication procedure and issue common key" to perform the authentication procedure for the electronic camera 10. In addition, the program issues a "common key" to establish communicative connection only when the common key is pressed. When the processing of step S762 is finished, the program goes to the next step S764 "END" to return to the calling program routine.

If the present connection is not the first time, the program goes to step S766 "Second time connection?". If it is judged that the present connection is the second time in step S766, the program goes to step S768 "Perform authentication procedure and issue inherent key" to perform the authentication procedure for the electronic camera 10. Furthermore, the program issues the "unique key" to establish the communicative connection only when the unique key is pressed. When the processing of step S768 is finished, the program goes to the next step S764 "END" to return to the calling program routine.

If it is judged that the present connection is not the second time in step S766 (the present connection is the third time or after), the program goes to step S770 "Unique key?" to judge whether the unique key issued in step S768 is pressed. If the key pressed is not the unique key issued in step S768, the program goes to step S764 "END" to return to the calling subroutine. If the key pressed is the unique key issued in step S768, the program goes to step S772 "Authentication procedure," and performs the authentication procedure for the electronic camera 10 to establish communicative connection. When the processing in step S772 is finished, the programs goes to step S764 "END" to return to the calling program routine.

As described above, it becomes possible to easily identify a user by using the common key and unique key that are issued at the time of connection.

As described above, a communication terminal apparatus according to the present invention comprises: communication means that can connect with a host computer; wireless communication means that can connect with connecting equipment by wireless communication; storage means for storing image information showing the appearance of the connecting equipment; display means for displaying the appearance of the connecting equipment on the basis of image information showing the appearance of the connecting equipment that is stored in the storage means when wireless communication with the connecting equipment is started; and designating means for establishing communication with connecting equipment thereafter which is designated, when the appearance of the desired connecting equipment that is displayed in the display means is designated, in which the communication means receives and stores image information showing the appearance of the connecting equipment from the host computer if the image information showing the appearance of the connecting equipment is not stored in the storage means, and hence it becomes possible for the communication terminal to receive the appearance and product names of all the connecting equipment which are connected to the communication terminal, to display them in the display means, and to establish communication with designating desired connecting equipment.

In addition, another aspect of the present invention is a communication terminal apparatus, which, when establishing communication with desired connecting equipment, executes the steps of: (a) receiving equipment information, showing the connecting equipment, from the connecting equipment; (b) connecting to the host computer on the basis of the equipment information, and receiving image information showing the appearance of the connecting equipment from the host computer; (c) displaying the appearance of the connecting equipment in display means of the communication terminal apparatus on the basis of the image information which is received or was received and stored beforehand; and (d) establishing communication with connecting equipment, when the appearance of the desired connecting equipment that is displayed in the display means is designated, and hence it becomes possible for the communication terminal to receive the appearance and product names of all the connecting equipment which are connected to the communication terminal, to display them in the display means, and to establish communication with designating desired connecting equipment.

As described above, a connected destination selection method in wireless LAN according to the present invention comprises the steps of: automatically starting communication when the connected equipment and the connecting equipment come within a wireless communication range; the connected equipment receiving identification information that can specify the connecting equipment from among the connecting equipment; display means of the connected equipment displaying the identification information for identifying connecting equipment; the wireless LAN establishing wireless communication between the connecting equipment and the connected equipment when desired connecting equipment is designated from among the displayed connecting equipment, and hence it becomes possible to select desired connecting equipment from among a plurality of connecting equipment existing in a communication range of connected equipment, and to communicate with the desired connecting equipment.

According to still another aspect of the present invention, depending on pressing of a key, provided in the connecting equipment, and a key, provided in the connected equipment, wireless communication between the connected equipment and the connecting equipment is established, and hence it becomes possible to select desired connecting equipment from among a plurality of connecting equipment existing in a communication range of connected equipment, and to communicate with the desired connecting equipment.

According to a further aspect of the present invention, if a predetermined key, provided in the connecting equipment, and a predetermined key, provided in the connected equipment, are pressed nearly at the same time, wireless connection between the connected (equipment and the connecting equipment is established, and hence it becomes possible to select desired connecting equipment from among a plurality of connecting equipment existing in a communication range of connected equipment, and to communicate with the desired connecting equipment.

According to a still further aspect of the present invention, wireless connection between the connected equipment and the connecting equipment is established if a predetermined key, provided in the connecting equipment, and a predetermined key, provided in the connected equipment, are pressed in predetermined sequence, and hence it becomes possible to select desired connecting equipment from among a plurality of connecting equipment existing in a communication range of connected equipment, and to communicate with the desired connecting equipment.

According to another aspect of the present invention, when the connected equipment receives sound that is unique to the connecting equipment and is given from the connecting equipment, wireless connection between the connected equipment and the connecting equipment is established, and hence it becomes possible to select desired connecting equipment from among a plurality of connecting equipment existing in a communication range of connected equipment, and to communicate with the desired connecting equipment.

According to still another aspect of the present invention, the connecting equipment takes a photograph of expression in display means of the connected equipment; displayed contents of the connected equipment are detected; and, wireless connection with the connected equipment is established if these displayed contents are predetermined displayed contents, and hence it becomes possible to select desired connecting equipment from among a plurality of connecting equipment existing in a communication range of connected equipment, and to communicate with the desired connecting equipment.

According to a further aspect of the present invention, if the connecting equipment and the connected equipment are contacted, the connected equipment and the connecting equipment recognize each other and wireless connection between the connected equipment and the connecting equipment is established, and hence it becomes possible to select desired connecting equipment from among a plurality of connecting equipment existing in a communication range of connected equipment, and to communicate with the desired connecting equipment.

According to a further aspect of the present invention: wireless connection is automatically established when the connected equipment and the connecting equipment come within a wireless communication range; and a user is informing of the establishment of wireless connection by giving sound, light, or vibration from the information means provided in the connected equipment when the wireless connection is established, and hence it becomes possible to easily know that desired connecting equipment is selected from among a plurality of connecting equipment existing in a communication range of connected equipment.

According to a still further aspect of the present invention: communication is automatically started when the connected equipment and the connecting equipment come within a wireless communication range; common key information used for authentication is sent to the connecting equipment if it is the first time connection; wireless connection is established by detecting that a common key, provided in the connecting equipment, and a common key, provided in the connected equipment, are pressed; predetermined key information used for authentication is sent to the connecting equipment if it is the second time connection; communication is continued as information for recognizing a user by detecting that a predetermined key, provided in the connecting equipment, and a predetermined key, provided in the connected equipment, are pressed; the user is recognized and communication is continued by detecting that a predetermined key, provided in the connecting equipment, and a predetermined key, provided in the connected equipment, are pressed, if it is the third time connection or after, and hence it becomes possible to select easily desired connecting equipment from among a plurality of connecting equipment existing in a communication range of connected equipment, and to communicate with the desired connecting equipment.

According to another aspect of the present invention: both of connected equipment and connecting equipment automatically authenticate each other and wireless connection is established when coming within a wireless communication range; and a user can designate a mode, in which mutual authentication is limited to the first time one, or another mode, in which mutual authentication is performed first two times and more, from designating means provided in the connected equipment, and hence it becomes possible to select desired connecting equipment from among a plurality of connecting equipment existing in a communication range of connected equipment, and to prevent unnecessary communication.

It should be understood, however, that there is no intention to limit the invention to the specific forms disclosed, but on the contrary, the invention is to cover all modifications, alternate constructions and equivalents falling within the spirit and scope of the invention as expressed in the appended claims.

FIG. 3
10 BODY OF ELECTRONIC CAMERA
12 IMAGING DEVICE
16 IMAGE PROCESSING DEVICE
18 FRAME MEMORY
34 D/A CONVERTER
32 DISPLAY DEVICE
36 CHARACTER GENERATOR
26 MEMORY
14 INFORMATION PROCESSING DEVICE
20 COMPRESSION/DECOMPRESSION DEVICE
15 VIBRATION DETECTION DEVICE
28 TRANSMISSION AND RECEPTION DEVICE
30 ANTENNA
13 BUZZER
24 RECORDING MEDIUM INTERFACE
22 RECORDING MEDIUM
19 INPUT DEVICE
FIG. 4
1 IMAGE SELECTION
2 MENU
3 TELEPHONE DIRECTORY
4 SETTING
5 CALL
6 CLEAR
7 OFF
FIG. 5
40 COMMUNICATION TERMINAL
44 WIRELESS COMMUNICATION DEVICE (FOR PERIPHERAL)
58 TRANSMISSION AND RECEPTION DEVICE
60 TRANSMISSION AND RECEPTION BUFFER
56 TRANSMISSION AND RECEPTION DEVICE
54 WIRELESS COMMUNICATION DEVICE (FOR PUBLIC LINE)
68 EQUIPMENT INFORMATION STORAGE DEVICE
48 DESIGNATING DEVICE
46 DISPLAY DEVICE
　IMAGE DISPLAY
　CHARACTER DISPLAY
FIG. 7
1 ELECTRONIC CAMERA
2 COMMUNICATION TERMINAL
S802 START SEARCH MODE
S804 PRODUCT NAME REQUESTED?
S806 TRANSMIT PRODUCT NAME
S808 CONNECTION APPROVAL RECEIVED?
S810 AUTHENTICATION PROCEDURE
S822 START SEARCH MODE
S824 TRANSMIT PRODUCT NAME REQUEST
S826 PRODUCT NAME RECEIVED?
S828 CONNECT TERMINAL TO SERVER FROM PRODUCT NAME
S830 OBTAIN PRODUCT APPEARANCE INFORMATION FROM SERVER
S832 DISPLAY PRODUCT NAME AND APPEARANCE
S834 Δ KEY PRESSED?
S836 ROLL UP DISPLAY
S838 ∇ KEY PRESSED?
S840 ROLL DOWN DISPLAY
S842 SETTING KEY PRESSED?
S844 SET CONNECTING EQUIPMENT
S846 TRANSMIT CONNECTION APPROVAL
S848 AUTHENTICATION PROCEDURE
FIG. 8
1 CONNECTED DESTINATION?
FIG. 9
1 ELECTRONIC CAMERA
2 COMMUNICATION TERMINAL
S102 START SEARCH MODE
S104 IS CONNECTABLE EQUIPMENT PRESENT?
S106 CONNECTION ACKNOWLEDGEMENT RECEIVED?
S108 ↑ KEY PRESSED?
S110 RESPOND TO NO KEYING
S112 RESPOND TO KEYING
S114 CONNECTION APPROVAL RECEIVED?
S116 AUTHENTICATION PROCEDURE
S122 START SEARCH MODE
S124 IS CONNECTABLE EQUIPMENT PRESENT?
S126 ↑ KEY PRESSED?
S128 TRANSMIT CONNECTION ACKNOWLEDGEMENT
S130 RESPONSE TO KEYING RECEIVED?
S132 TRANSMIT CONNECTION APPROVAL
S134 AUTHENTICATION PROCEDURE
FIG. 10
1 ELECTRONIC CAMERA
2 COMMUNICATION TERMINAL
S202 START KEY SETTING
S204 KEY PRESSED?
S206 STORE KEY SEQUENCE
S208 KEY SETTING COMPLETED?
S210 START SEARCH MODE
S212 IS CONNECTABLE EQUIPMENT PRESENT?
S214 KEY SEQUENCE RECEIVED?
S216 SEQUENCE COINCIDES?
S218 RESPOND TO DISCREPANCY
S220 RESPOND TO COINCIDENCE
S222 CONNECTION APPROVAL RECEIVED?
S224 AUTHENTICATION PROCEDURE
S232 START SEARCH MODE
S234 IS CONNECTABLE EQUIPMENT PRESENT?
S236 KEY PRESSED?
S238 STORE KEY SEQUENCE
S240 KEY SETTING COMPLETED?
S242 TRANSMIT KEY SEQUENCE
S244 COINCIDENCE RESPONSE RECEIVED?
S246 TRANSMIT CONNECTION APPROVAL
S248 AUTHENTICATION PROCEDURE
FIG. 11
1 ELECTRONIC CAMERA
2 COMMUNICATION TERMINAL
S302 START SEARCH MODE
S304 IS CONNECTABLE EQUIPMENT PRESENT?
S306 CONNECTION ACKNOWLEDGEMENT RECEIVED?
S308 SOUND BUZZER
S310 BUZZER ACKNOWLEDGED?
S312 RESPOND BUZZER

S314 CONNECTION APPROVAL RECEIVED?
S316 AUTHENTICATION PROCEDURE
S322 START SEARCH MODE
S324 IS CONNECTABLE EQUIPMENT PRESENT?
S326 START KEY PRESSED?
S328 TRANSMIT CONNECTION ACKNOWLEDGEMENT
S330 BUZZER SOUND DETECTED?
S332 TRANSMIT BUZZER ACKNOWLEDGEMENT
S334 BUZZER RESPONSE RECEIVE-D?
S336 TRANSMIT CONNECTION APPROVAL
S338 AUTHENTICATION PROCEDURE
FIG. 12
1 ELECTRONIC CAMERA
2 COMMUNICATION TERMINAL
S402 START SEARCH MODE
S404 SET MODE IN STROBE-INHIBITION, MACRO POSITION, AND MOVIE-THROUGH
S406 CONNECTION ACKNOWLEDGEMENT FIGURE?
S408 STOP MOVIE-THROUGH MODE
S410 TRANSMIT FIGURE ACKNOWLEDGEMENT
S412 CONNECTION APPROVAL RECEIVED?
S414 AUTHENTICATION PROCEDURE
S422 START SEARCH MODE
S424 DISPLAY CONNECTION ACKNOWLEDGEMENT FIGURE
S426 ACKNOWLEDGEMENT DETECTED?
S428 TRANSMIT CONNECTION APPROVAL
S430 AUTHENTICATION PROCEDURE
FIG. 13
1 NAME OF CONNECTED EQUIPMENT
FIG. 14
1 ELECTRONIC CAMERA
2 COMMUNICATION TERMINAL
S402 START SEARCH MODE
S404 SET MODE IN STROBE-INHIBITION, MACRO POSITION, AND MOVIE-THROUGH
S407 FLASHING PERIOD FOR ACKNOWLEDGEMENT?
S408 STOP MOVIE-THROUGH MODE
S410 TRANSMIT FIGURE ACKNOWLEDGEMENT
S412 CONNECTION APPROVAL RECEIVED?
S414 AUTHENTICATION PROCEDURE
S422 START SEARCH MODE
S425 DISPLAY CONNECTION ACKNOWLEDGEMENT FLASHING
S426 ACKNOWLEDGEMENT DETECTED?
S427 STOP FLASHING
S428 TRANSMIT CONNECTION APPROVAL
S430 AUTHENTICATION PROCEDURE
FIG. 15
1 ELECTRONIC CAMERA
2 COMMUNICATION TERMINAL
S502 START SEARCH MODE
S504 START VIBRATION MONITORING
S506 SHOCK DETECTED?
S508 STOP VIBRATION MONITORING
S510 TRANSMIT SHOCK ACKNOWLEDGEMENT
S512 CONNECTION APPROVAL RECEIVED?
S514 AUTHENTICATION PROCEDURE
S522 START SEARCH MODE
S524 MONITOR MICROPHONE INPUT
S526 IMPACT SOUND DETECTED?
S528 SHOCK ACKNOWLEDGEMENT DETECTED?
S530 TRANSMIT CONNECTION APPROVAL
S532 AUTHENTICATION PROCEDURE
FIG. 16
1 ELECTRONIC CAMERA
2 COMMUNICATION TERMINAL
S602 START SEARCH MODE
S604 PRODUCT NAME REQUESTED?
S606 TRANSMIT PRODUCT NAME
S608 CONNECTION APPROVAL RECEIVED?
S610 AUTHENTICATION PROCEDURE
S622 START SEARCH MODE
S624 TRANSMIT PRODUCT NAME REQUEST
S626 PRODUCT NAME RECEIVED?
S628 DISPLAY PRODUCT NAME
S630 ↑ KEY PRESSED?
S632 ROLL UP DISPLAY
S634 ↓ KEY PRESSED?
S636 ROLL DOWN DISPLAY
S638 SETTING KEY PRESSED?
S640 SET CONNECTED EQUIPMENT
S642 TRANSMIT CONNECTION APPROVAL
S644 AUTHENTICATION PROCEDURE
FIG. 17
1 CONNECTED DESTINATION?
FIG. 18
1 COMMUNICATION TERMINAL
S622 START SEARCH MODE
S624 TRANSMIT PRODUCT NAME REQUEST
S626 PRODUCT NAME RECEIVED?
S628 DISPLAY PRODUCT NAME
S630 ↑ KEY PRESSED?
S632 ROLL UP DISPLAY
S634 ↓ KEY PRESSED?
S636 ROLL DOWN DISPLAY
S638 SETTING KEY PRESSED?
S640 SET CONNECTED EQUIPMENT
S642 TRANSMIT CONNECTION APPROVAL
S644 AUTHENTICATION PROCEDURE
S650 REFUSAL SETTING MODE?
S652 START REFUSAL SETTING DISPLAY
S654 ↑ KEY PRESSED?
S656 ROLL UP DISPLAY
S658 ↓ KEY PRESSED?
S660 ROLL DOWN DISPLAY
S662 SETTING KEY PRESSED?
S664 SET REFUSED EQUIPMENT
FIG. 19
1 CONNECTED DESTINATION?
2 SELECT DESTINATION WITH ARROW KEYS
3 MENU
4 TELEPHONE DIRECTORY
5 SETTING
6 CALL
7 CLEAR
8 OFF
FIG. 20
1 ELECTRONIC CAMERA
2 COMMUNICATION TERMINAL
S702 START SEARCH MODE
S704 IS CONNECTABLE EQUIPMENT PRESENT?
S706 CONNECTION ACKNOWLEDGEMENT RECEIVED?
S708 TRANSMIT CONNECTION START
S714 CONNECTION APPROVAL RECEIVED?
S716 AUTHENTICATION PROCEDURE
S722 START SEARCH MODE
S724 IS CONNECTABLE EQUIPMENT PRESENT?
S728 TRANSMIT CONNECTION ACKNOWLEDGEMENT

S730 CONNECTION START RECEIVED?
S732 TRANSMIT CONNECTION APPROVAL
S734 AUTHENTICATION PROCEDURE
S736 GIVE DIAL-IN SOUND
FIG. 21
1 COMMUNICATION TERMINAL
S722 START SEARCH MODE
S724 IS CONNECTABLE EQUIPMENT PRESENT?
S728 TRANSMIT CONNECTION ACKNOWLEDGEMENT
S730 CONNECTION START RECEIVED?
S732 TRANSMIT CONNECTION APPROVAL
S734 AUTHENTICATION PROCEDURE
S740 ONE-TIME MODE?
S742 SET MODE IN AUTHENTIC CODE INHIBITION
FIG. 22
1 COMMUNICATION TERMINAL
S752 ONE-TIME RELEASE MODE?
S754 RESTORE INHIBITED AUTHENTIC CODE
FIG. 23
S702 START SEARCH MODE
S704 IS CONNECTABLE EQUIPMENT PRESENT?
S706 CONNECTION ACKNOWLEDGEMENT RECEIVED?
S708 TRANSMIT CONNECTION START
S714 CONNECTION APPROVAL RECEIVED?
S716 AUTHENTICATION PROCEDURE
S722 START SEARCH MODE
S724 IS CONNECTABLE EQUIPMENT PRESENT?
S728 TRANSMIT CONNECTION ACKNOWLEDGEMENT
S730 CONNECTION START RECEIVED?
S732 TRANSMIT CONNECTION APPROVAL
S760 FIRST TIME CONNECTION?
S762 PERFORM AUTHENTICATION PROCEDURE AND ISSUE COMMON KEY
S766 SECOND TIME CONNECTION?
S770 UNIQUE KEY?
S772 AUTHENTICATION PROCEDURE
S768 PERFORM AUTHENTICATION PROCEDURE AND ISSUE INHERENT KEY

What is claimed is:

1. A method of selectively communicating with wireless equipment in a wireless LAN, the wireless LAN comprising:
at least one wireless device configured to perform wireless communication; and
a communication terminal apparatus configured to perform wireless communication with the at least one wireless device, said communication terminal apparatus including a display device and a designating device, wherein:
the wireless LAN automatically permits communication between said at least one wireless device and said communication terminal apparatus when said communication terminal apparatus and said at least one wireless device come within a wireless communication range;
the communication terminal apparatus, in response to a request sent from the communication terminal apparatus to the at least one wireless device, receives identification information that can specify said at least one wireless device;
the display device of said communication terminal apparatus displays identification information for identifying said at least one wireless device; and
the wireless LAN establishes a wireless communication connection between said at least one wireless device and said communication terminal apparatus when said at least one wireless device is designated with the designating device.

2. The method according to claim 1, wherein:
the display device of said communication terminal apparatus displays identification information for identifying at least one wireless device; and the wireless LAN interrupts wireless communication between said at least one wireless device and said communication terminal apparatus when the at least one wireless device is designated with the designating device.

3. The method according to claim 1, wherein said at least one wireless device includes at least one of a printer, a camera, a personal computer and a wireless phone.

4. A method of selectively communicating with wireless equipment in a wireless LAN, the wireless LAN comprising:
at least one wireless device configured to perform wireless communication, wherein said at least one wireless device including at least one of a printer, a camera, a personal computer and a wireless phone; and
a communication terminal apparatus configured to perform wireless communication with said at least one wireless device, the method comprising:
judging whether said at least one wireless device and said communication terminal apparatus are within wireless communication range of each other;
according to pressing of a key, provided in said at least one wireless device, and pressing a key, provided in said communication terminal apparatus, establishing the wireless connection between said communication terminal apparatus and said at least one wireless device when it is judged that said at least one wireless device and said communication terminal apparatus are within the wireless communication range of each other;
wirelessly communicating image data between said at least one wireless device and said communication terminal apparatus;
wirelessly communicating the image data between said communication terminal apparatus and a publicly switched network; and
wirelessly communicating image data between said at least one wireless device and said communication terminal apparatus.

* * * * *